US006637028B1

(12) United States Patent
Voyticky et al.

(10) Patent No.: US 6,637,028 B1
(45) **Date of Patent: *Oct. 21, 2003**

(54) INTEGRATED TELEVISION AND INTERNET INFORMATION SYSTEM

(75) Inventors: Joseph F. Voyticky, Scarsdale, NY (US); Yves D. Jean, Scotch Plains, NJ (US)

(73) Assignee: Cliq Distribution, Inc., Scarsdale, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/474,163

(22) Filed: Dec. 29, 1999

Related U.S. Application Data

(63) Continuation-in-part of application No. 09/252,071, filed on Feb. 18, 1999.

(51) Int. Cl.[7] ........................ H04N 7/025; H04N 7/173; H04N 7/16; G06F 3/00; G06F 13/00

(52) U.S. Cl. ............................ 725/42; 725/32; 725/48; 725/109; 725/112; 725/121; 725/141

(58) Field of Search .............................. 725/11, 12, 29, 725/42, 107, 109, 110, 14, 40, 60

(56) References Cited

U.S. PATENT DOCUMENTS

| | | | | |
|---|---|---|---|---|
| 5,201,067 A | | 4/1993 | Grube et al. | |
| 5,235,414 A | | 8/1993 | Cohen | |
| 5,596,705 A | | 1/1997 | Reimer et al. | |
| 5,696,905 A | | 12/1997 | Reimer et al. | |
| 5,703,795 A | | 12/1997 | Mankovitz | |
| 5,708,845 A | | 1/1998 | Wistendahl et al. | |
| 5,715,400 A | * | 2/1998 | Reimer et al. | 705/27 |
| 5,737,552 A | | 4/1998 | Lavallee et al. | |
| 5,761,606 A | | 6/1998 | Wolzien | |
| 5,778,181 A | | 7/1998 | Hidary et al. | |
| 5,818,441 A | | 10/1998 | Throckmorton et al. | |
| 5,818,935 A | | 10/1998 | Maa | |
| 5,907,322 A | | 5/1999 | Kelly et al. | |

FOREIGN PATENT DOCUMENTS

| | | |
|---|---|---|
| FR | 2 726 146 | 4/1996 |
| WO | WO 97/36422 | 10/1997 |
| WO | WO 98/03012 | 1/1998 |

* cited by examiner

*Primary Examiner*—Vivek Srivastava
*Assistant Examiner*—Christopher Nalevanko
(74) *Attorney, Agent, or Firm*—Proskauer Rose LLP

(57) ABSTRACT

A method and apparatus that enables a user to store or indicate event information while watching a television broadcast is disclosed. The event information is transmitted to a server, preferably via the Internet, either in batches or in real-time. Based on the event information, the server determines which program the user was watching when the event information was stored or indicated, and the time within that program. Based on the determined program and time, the server determines an assortment of goods and services that were displayed on the user's television when the event information was stored. This assortment is presented to the user, preferably via the Internet.

19 Claims, 22 Drawing Sheets

250

| SERVICE & DEVICE CONFIGURATION TABLE | | | | |
|---|---|---|---|---|
| DISPLAY | TUNER DEVICE | MANUFACTURER | SERVICE NAME | SERVICE ID |
| AUX. IN | CABLE BOX | GENERAL INSTRUMENT | MANHATTAN CABLE | 3888 |
| CABLE IN | TV | SONY | MANHATTAN CABLE | 3888 |

260

| TUNER DEVICE CURRENT STATE TABLE | |
|---|---|
| DEVICE | CHANNEL |
| TV | 5 |
| CABLE BOX | 4 |

FIG. 5

270

| EVENT VARIABLES | | |
|---|---|---|
| DATE | TIME | CURRENT DISPLAY DEVICE |
| 10/21/1998 | 9:00 PM | TV (CABLE IN) |

FIG. 6

280

| TIMESTAMP TABLE | | | |
|---|---|---|---|
| DATE | TIME | CHANNEL | TUNER DEVICE |
| 10/21/1998 | 9:00 PM | 4 | TV |
| 11/10/1998 | 8:26 PM | 5 | CABLE BOX |
| 12/21/1998 | 4:00 PM | 10 | TV |
| 12/21/1998 | 4:15 PM | 10 | TV |

FIG. 7

905

| MEDIA SERVICE TABLE | | | |
|---|---|---|---|
| SERVICE ID | NETWORK ID | CHANNEL | LOCATION CODE |
| 3888 | USA NETWORKS | 20 | 10027 |
| 3888 | HBO 1 | 14 | 10027 |
| 3888 | FOX USA | 5 | 10027 |

FIG. 15

| PROGRAM PRODUCTION TABLE | | | | |
|---|---|---|---|---|
| PRODUCTION COMPANY NAME | PRODUCTION COMPANY ID | CONTENT NAME | CONTENT ID | CONTENT TYPE |
| RYSHER ENTERTAINMENT | 89033 | NASH BRIDGES | 8903372 | PROGRAM |
| SPELLING ENTERTAINMENT | 20393 | MELROSE PLACE | 2039312 | PROGRAM |
| NEW LINE PRODUCTIONS | 40555 | RUSH HOUR | 4055545 | PROGRAM |
| LEO BURNETT CO. | 32045 | PEPSI STUFF | 3204523 | COMMERCIAL |

909

FIG. 16A

| BROADCAST REPORT TABLE | | | | | |
|---|---|---|---|---|---|
| CONTENT TYPE | CONTENT ID | FADE IN TIME | FADE OUT TIME | PROGRAM SYNCHRON-IZATION TIME | BROADCAST SYNCHRON-IZATION TIME |
| PROGRAM | 2039312 | 8:22 PM | 8:34 PM | 00:23 | 8:25 PM |
| COMMERCIAL | 3204523 | 8:34 PM | 8:37 PM | 00:01 | 8:35 PM |
| PROGRAM | 2039312 | 8:37 PM | 8:45 PM | 00:32 | 8:37 PM |

910

FIG. 16B

| PRODUCT DISPLAY TABLE | | | |
|---|---|---|---|
| CONTENT ID | PRODUCT/ SERVICE | APPEAR TIME | DISAPPEAR TIME |
| 2039312 | DESK LAMP #1 | 00:02:10 | 00:03:14 |
| 2039312 | DESK LAMP #1 | 00:04:46 | 00:05:02 |
| 2039312 | WOMEN'S SHOES #1 | 00:02:10 | 00:03:14 |

920

FIG. 19

| PRODUCT TABLE | | | |
|---|---|---|---|
| PRODUCT/ SERVICE | MANUFACTURER | INVENTORY | PRICE |
| WATCH #1 | MOVADO | 40 | 1,500.00 |
| DESK LAMP #1 | LUXO | 2000 | 100.00 |
| WOMEN'S SHOES #1 | MANOLA BLAHNIK | 300 | 200.00 |

930

FIG. 20

INTEGRATED TELEVISION AND INTERNET INFORMATION SYSTEM

CROSS REFERENCE TO RELATED APPLICATIONS

This application is a continuation-in-part of application No. 09/252,071, filed Feb. 18, 1999, which is incorporated herein by reference.

BACKGROUND OF THE INVENTION

This invention relates to the field of facilitating commerce by providing access to information about goods and services that are displayed in television broadcasts.

Using television commercials to promote products is a widespread practice. Typically, viewers watch certain programs on television because they are interested in those programs. Television stations capitalize on this situation by broadcasting commercials interspersed with the program itself. These commercials typically try to convince the viewer to buy a particular product. As used herein, the term "product" refers to both goods and services.

Interspersing commercials within television programs, however, has some significant drawbacks. For example, from the perspective of the viewer, television commercials are often perceived as annoying interruptions to the program that the viewer wishes to watch. Even when a viewer is interested in a particular product in a commercial, the viewer may prefer to find out about it after he has finished watching the program. This cannot be accomplished with conventional television broadcasts.

Another drawback, from the viewer's perspective, is that the viewer has no control over the subject matter of the commercials that he will see, since the content of traditional commercials is determined solely by the advertisers. As a result, many viewers may not be interested in the commercials that they see.

In contrast, since the viewer selects the program that he is watching, the viewer is presumably interested in the contents of that program. During a conventional broadcast of the program itself, however, the viewer has no way to obtain information about any products that he sees in the program (e.g., a certain jacket being worn by an actor in a TV sitcom).

Traditional commercials also have drawbacks from the broadcaster's perspective. First, because commercials only take up a relatively small fraction of the total time of a broadcast, the amount of air time that broadcasters can sell is limited. And if a broadcaster attempts to overcome this limitation by increasing the amount of commercials, the broadcaster risks losing its viewers, because they may switch to other stations, only to return once the commercial is over. Hence, no benefit is obtained for the advertiser, the broadcaster, and the consumer.

The Internet is another conventional forum in which products are advertised. These advertisements typically take the form of advertisements displayed on a website and generally appear on the screen simultaneously with the desired information, in a distinct section of the display. Unlike traditional television commercials, such advertisements do not preclude the user from viewing other information. If the user is interested in the Internet advertisement, the user can click on the advertisement and proceed accordingly. If on the other hand, the user is not interested, the user simply ignores the advertisement and continues obtaining the information in which he is interested. Internet advertisements are therefore less intrusive than television commercials. Internet advertisements also provide an added benefit, in that, once an interested customer has been found, a sale transaction can be facilitated on the spot.

Despite these advantages, however, product commercialization using the Internet can only take place when the relevant users are actually logged on to the Internet. Even among families with access to the Internet, however, the total amount of time spent logged on to the Internet in this country is dwarfed by the total amount of time spent watching television. As a result, the marketing power of Internet advertisements is still relatively insignificant in comparison to the marketing power of television commercials.

A commercialization system that does not suffer from the drawbacks described above would be desirable to both viewers and broadcasters. Until now, however, no such systems have been implemented.

In the past, attempts have been made to combine television and Internet commercialization. The simplest of these combinations is displaying a URL (uniform resource locator), or "address," of a website on the television during a traditional television commercial. This system is problematic for both the viewer and the advertiser, because the viewer may not have a pen handy to write the URL down. And even in cases where the user does write the URL down, the paper may not be handy the next time the user logs on to the Internet. Either of these scenarios would result in a lost opportunity to promote a sale, and a lost opportunity for a consumer to obtain a product in which he is interested.

Another existing combined television/Internet system is WebTV. WebTV allows its users to view a website on a traditional television display. Recent innovations have even allowed a website to be accessed without interrupting the television signal, using a picture in picture format. But in WebTV, the Internet and television-viewing sections are largely independent, and there is no interaction between the URL accessed and the television program being viewed. Finding information about products that appear within a show must be accomplished using traditional search methods.

Yet another combined television/Internet system is described in U.S. Pat. No. 5,778,181. The '181 patent describes transmitting URLs during the vertical blanking interval of a television broadcasting signal. These URLs are extracted at the viewer's home, and the associated web pages are fetched (via the Internet) while the viewer is still watching his television. In the '181 patent, however, the viewer is merely fed two streams of information, with one displayed on the television, and the other displayed on a computer monitor. As a result, many of the disadvantages of traditional television viewing remain. In addition, the user must divert his attention away from the program that he is watching in order to obtain the information being displayed on the Internet.

SUMMARY OF THE INVENTION

The present invention advantageously overcomes many of the aforementioned disadvantages and provides an integrated television/Internet commercialization system. This system enables a user to watch television in a traditional manner, but also provides the user with an opportunity to indicate interest in things that are being displayed on the television. This indication could be made, for example, by pressing a button on a customized handheld remote control. In some preferred embodiments, the system stores these indications. After the user has finished watching the program (or at such other time, as the user may desire), these indications are transferred to a remote server, which presents to the user information about the products that were being displayed at the time the user made each indication. In other preferred embodiments, the system forwards the indications to a remote server that notes the time of arrival for each indication. The server then presents to the user information about the products that were being displayed at the time the user made each indication.

According to one aspect of the present invention, a method of commercializing products that are present in a television broadcast of a program is provided. The method includes the steps of inputting product information that identifies a plurality of products and associated times of presence in the program, inputting skew information that identifies a correspondence between an actual time of broadcast and a relative time within the program, and inputting a signal that was generated in response to an indication of interest made by a user. The method also includes the steps of determining a time-of-interest based on when the signal arrived, identifying a specific portion of the program that was being broadcast at the time of interest based on the time of interest and the inputted skew information, determining an assortment of products that were present in the television broadcast at the time of interest, and presenting the determined assortment of products to the user.

According to another aspect of the present invention, a method of commercializing products that are present in multiple simultaneous television broadcasts of programs is provided. The method includes the steps of inputting, for each of the programs, product information that identifies products which are present in the respective program and associated times of presence, inputting skew information that identifies a correspondence between an actual time of broadcast and a relative time within the respective program, inputting an event signal that was generated in response to an indication of interest made by a user, and inputting a channel-change signal that was generated in response to a channel change command made by the user. The method also includes the steps of determining a time-of-interest based on when the event signal arrived, determining a channel based on the channel-change signal, identifying a specific portion of the program that was being watched by the user based on the time-of-interest, the determined channel, and the inputted skew information, determining an assortment of products that were present in that program at the time-of-interest, and presenting the determined assortment of products to the user.

According to another aspect of the present invention, a method of commercializing products that are present in multiple simultaneous television broadcasts of programs is provided. The method includes the steps of inputting, for each of the programs, broadcast and product information that identifies products which are present in the broadcasts and times of presence for each of the products, inputting an event signal that was generated in response to an indication of interest made by a user, and inputting a channel-change signal that was generated in response to a channel change command made by the user. The method also includes the steps of determining an assortment of products that were present in the program that was being watched at the time the user made the indication of interest based on the event signal, the channel-change signal, and the inputted broadcast and product information, and presenting the determined assortment of products to the user.

According to yet another aspect of the present invention, a remote control apparatus is provided. The remote control apparatus includes a plurality of switches, an infrared light transmitter, and a radio frequency transmitter. In response to an actuation of a given one of the plurality of switches, (a) the radio frequency transmitter transmits information identifying the given one of the plurality of switches and (b) the infrared light transmitter generates a sequence of infrared light pulses corresponding to the given one of the plurality of switches.

According to yet another aspect of the present invention, a remote control apparatus is provided. The remote control apparatus includes a plurality of switches, an infrared light transmitter, and a radio frequency transceiver. In response to an actuation of a given one of the plurality of switches, the radio frequency transceiver transmits information identifying the given one of the plurality of switches. In response to a signal received by the radio frequency transceiver, the infrared light transmitter transmits a sequence of infrared light pulses corresponding to the received signal.

The above and other features and advantages of the present invention will be apparent from the following detailed. description of preferred embodiments. The detailed description is to be read in connection with the accompanying drawings, in which:

BRIEF DESCRIPTION OF THE DRAWINGS

FIG. 5 is a table specifying the channel setting for each tuner device.

FIG. 6 is a table of event variables, which is stored in the handheld remote in the first preferred embodiment.

FIG. 7 is a table of time stamps, which is also stored in the handheld remote in the first preferred embodiment.

FIG. 15 is a table indicating which channel is used by each network for each service provider.

FIG. 16A is a table that stores information relating to the programs supported by the system.

FIG. 16B is a table reporting the broadcasting of a program for a particular network.

FIG. 19 is a table indicating when each product appears and disappears in a given program.

FIG. 20 is a table of product information.

DETAILED DESCRIPTION OF THE PREFERRED EMBODIMENTS

Figure 1:
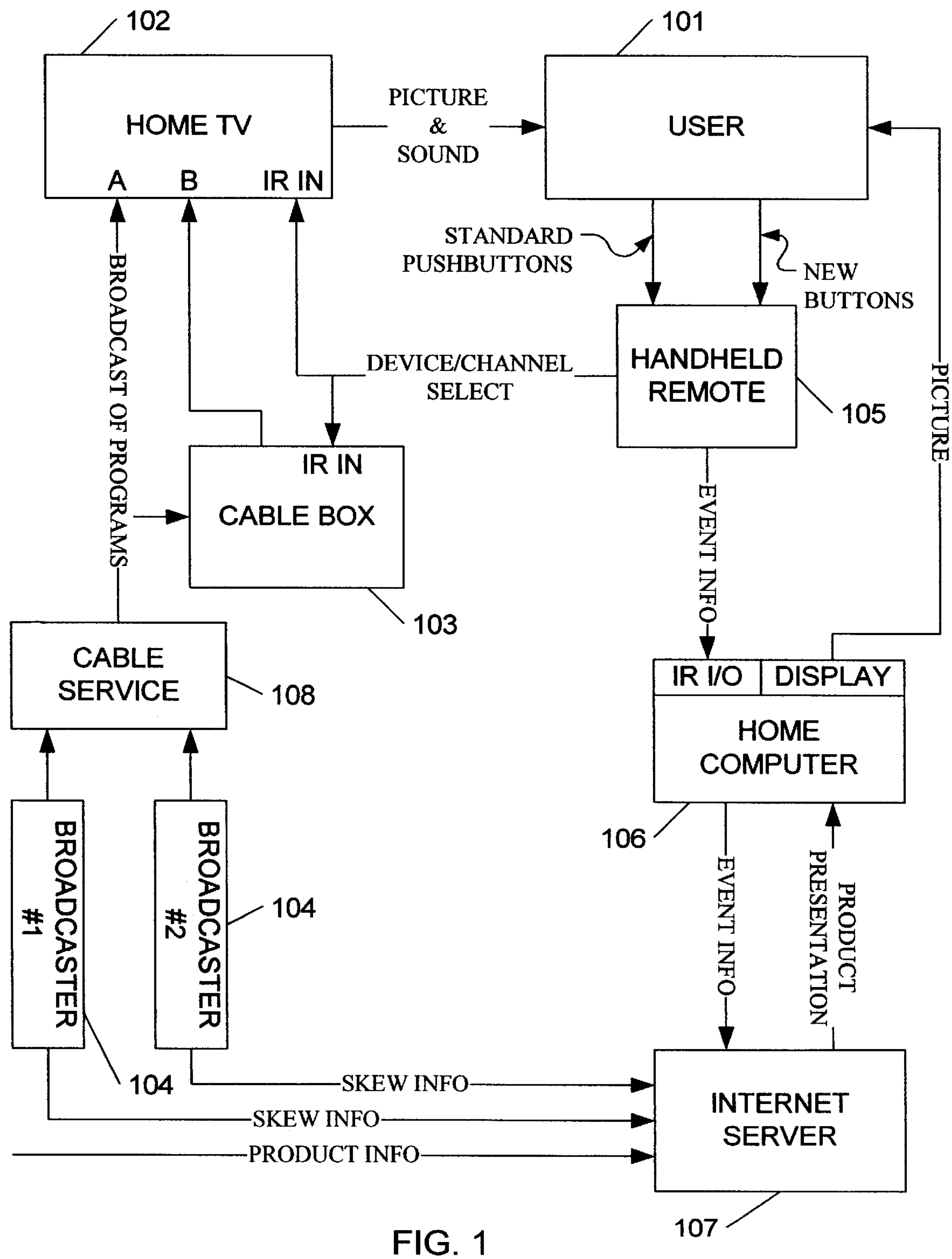
FIG. 1 is a system overview block diagram of a first preferred embodiment of the present invention.

FIG. 1 is a block diagram of a first preferred embodiment in accordance with the present invention. In this embodiment, television programs are broadcast from the broadcaster 104 (e.g., a television station) to the user's home in any conventional manner, including for example, broadcasts via a cable service 108. Alternatively, other types of broadcasts can be used, including, for example, satellite and ground based antennas transmissions (not shown). Traditional television commercials may be interspersed with the programs and broadcast over the same medium in a conventional manner.

The broadcast signals are distributed within the user's home in any conventional manner. In the illustrated setup, the cable signal is provided directly to the television 102, and also indirectly, via the cable box 103. Notably, no modifications to the conventional broadcasting equipment are required, and no special equipment is required by preexisting customers who are not using the present invention.

Preferably, the system is implemented using a customized handheld remote control unit 105 which performs all conventional universal remote functions. These functions are well known and include, for example, selecting a signal source, changing the channel on the currently selected signal source, and changing the volume on the TV set. Each of these functions is preferably implemented using conventional buttons on the handheld remote.

In addition to these conventional buttons, the handheld remote unit 105 of this embodiment preferably includes two additional buttons: an event button and a transfer button.

From the user's perspective, the experience of watching television 102 starts out the same as when he uses a conventional universal remote. For example, he can use the remote 105 to change channels or adjust the volume at any time. Whenever the user 101 sees something on his television 102 in which he is interested, the user presses the event button on the handheld remote 105, and continues to watch the program. Thus, the only change (as compares to traditional television watching) is the occasional pressing of the event button, which is a minimal interruption.

Each time the user 101 presses the event button, the remote 105 stores event information. Preferably, this event information includes the time that the event button was pressed, as well as the signal source and channel being watched at that time. This is described below in greater detail.

Once the user 101 finishes watching television 102, he takes the handheld remote 105 over to his home computer 106. Preferably, both the remote and the computer are equipped with displays and IR (infrared) transceivers. The user then points the remote's IR transceiver at the IR transceiver on the computer, and presses the transfer button on the remote to establish a communication session with the home computer. Set-up of this communication session may be facilitated by appropriate prompts to the user 101 on the displays on the remote 105 and the home computer 106. During the communication session, information pertaining to each press of the event button on the remote is transferred into the home computer. Alternatively, in place of the IR communication described herein, other types of communication links including, for example, radio frequency and X-10 communication, may be used.

After the event information has been transferred from the handheld remote 105 into the home computer 106, the home computer 106 establishes a connection with the central server 107 via the Internet, and sends the event information to the server.

Meanwhile, the server 107 has previously inputted product information that identifies products which are present in various programs, and times of presence within the programs for each of the products. This information can come, for example, from a database created by the producers of a program. Alternatively, this information could be inputted by a person watching the program who has noted the products in the program and the portion of the program in which those products appear. Numerous other scenarios can be readily envisioned.

In addition, the server 107 has previously inputted skew information, described in greater detail below, which indicates when each segment of a program is actually broadcast. The server uses this skew information to map "broadcast time" (which is an actual time, such as Jan. 2, 1999, 8:05:02 PM) into "program time" (which is a relative time within the uncut program, such as 56 minutes and 22 seconds from the start of a particular program). Preferably, the skew information will arrive from a cooperating broadcaster that sends the skew information to the server while the program is being broadcast.

The server 107 then determines an assortment of products that were displayed on the user's television 102 when the user pressed the event button on the remote 105, for each press of the event button. This is accomplished by referencing a previously inputted product data base that indicates which products appear in the program being watched, and the times that they appear (measured in program time).

The central server 107 then sends information about this assortment of products back to the home computer 106 via the Internet. This can be accomplished, for example, by sending a web page or database to the home computer 106. The product assortment is then presented to the user 101 on the display of home computer 106. The product assortment can be presented to the user in any number of ways. For example, a set of windows can be used, with one window representing each product in the assortment. Alternatively, a still image or a video clip of the selected moment of the program may be displayed. Numerous other alternatives presentation approaches can be readily envisioned.

This arrangement is advantageous to broadcasters because it expands commercialization into the time that the television program itself is being broadcast. It can even be used to commercialize products that appear during the commercials themselves (such as the shoes being worn by the spokesperson in a commercial for a car).

It is also advantageous to television viewers because it enables them to obtain information on and purchase products which attracted their interest.

Figure 2:
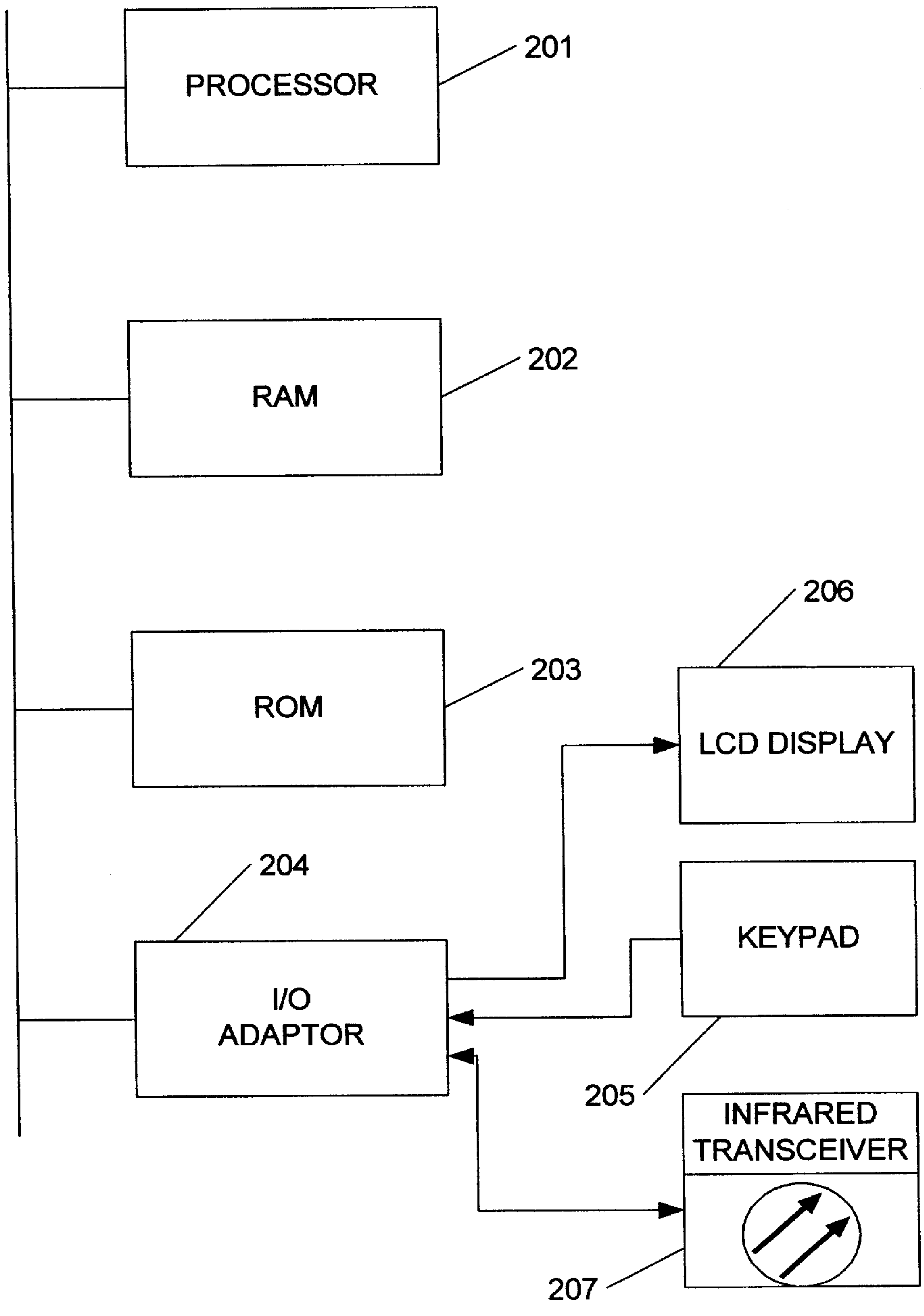
FIG. 2 is a block diagram of a handheld remote of the first preferred embodiment.

FIG. 2 is block diagram of the handheld remote unit of the first preferred embodiment. Preferably, it includes a processor 201 that is connected to RAM (Random Access Memory) 202, ROM (Read Only Memory) 203, and an I/O adapter 204 via a system bus. These components and their interconnections are well-known, as evidenced by the large number of universal remote controls available today. Most preferably, all of these components are integrated into a single integrated circuit.

Of course, various equivalents for each of these components may be substituted for the respective component. Examples of such substitutions include using hardwired logic in place of a processor running a program out of ROM, or using a RAM with a battery backup in place of the ROM. Numerous other modifications will be apparent to persons skilled in the relevant art.

The I/O adapter 204 enables the processor 201 to determine which keys on the keypad 205 are being pressed, in any conventional manner. In addition, the I/O adapter 204 enables the processor 201 to communicate with an IR transceiver 207. The Vishay Telefunken TFDT5500 is an example of a suitable IR transceiver 207. The I/O adapter 204 also enables the processor 201 to write to the liquid crystal display 206, also in any conventional manner.

The handheld remote of this embodiment performs three distinct functions: control of the devices in the user's home (e.g., the television 102 and the cable box 103 shown in FIG. 1), recording of events, and communication with the home computer 106 (also shown in FIG. 1), recording of events, and communication with the home computer 106 (also shown in FIG. 1).

The control mode is used to send appropriate IR control codes to various devices in the users home, as with conventional universal remote controls. These control codes could include, for example, changing the volume on the TV set, or changing the channel on the cable box. Communicating with such devices via IR commands is well-known, as exemplified by commercially available universal remote control devices. In this mode, the IR transceiver 207 operates as a transmit only device, and the processor 201 controls the IR transceiver 207 by sending signals to the I/O adapter 204.

The event recording mode is used by a television viewer to indicate that he is interested in a product that appears on the television. Preferably, this is implemented using a dedicated button located on the keypad 205, which the viewer presses to indicate that he is interested in a product that appears on the television. This button is referred to herein as the "event" button, which is not implemented on conventional universal remotes. Preferably, when a key-press for the event button is detected, the processor 201 in the remote stores appropriate information in memory in tables set up in RAM 202. These tables are explained in greater detail below.

In the communication mode, the remote sends the event information, which was stored in response to presses of the event button, to the computer 106. Preferably, this is implemented using a second dedicated button located on the keypad 205, which the viewer presses when he wants to transfer information from the remote 105 into the computer 106 (for subsequent uploading to the server 107). This button is referred to herein as the "transmit" button, which is also not implemented on conventional universal remotes. When a key-press for the transfer button is detected, the processor 201 initiates communication with the home computer 106, via the IR transceiver 207. It is envisioned that communication with the user's home computer will usually take place after the user has finished watching television, although this is not mandatory.

In this mode, the IR transceiver 207 in the handheld remote 105 is used to communicate with the home computer 106. While it is only necessary to transfer information in one direction (from the remote to the computer), the system is preferably implemented using two-way communication, to facilitate handshaking and to ensure that the data is transferred properly. Communication between home computers and other devices using IR transceivers is also well known, as evidenced by conventional IR technology based cordless computer keyboards, communications between handheld personal organizers, and the IRDA standard for such communications.

A single IR transceiver may be used for both the control mode and the communication mode, as explained above. Alternatively, the IR transceiver (e.g., an IRDA compliant transceiver) may be used only for communication with the computer. An independent IR transmitter or transceiver would then be used for controlling the entertainment devices.

In the embodiment described above, the device control functions, the event button, and the transmit button are implemented on a handheld remote. Alternative embodiments can be readily envisioned, including, for example, implementing all these functions on a home computer (or combined television home computer), and actuating them by pressing keys on the keyboard, by mouse clicks, or by voice control.

Figures 3, 4:
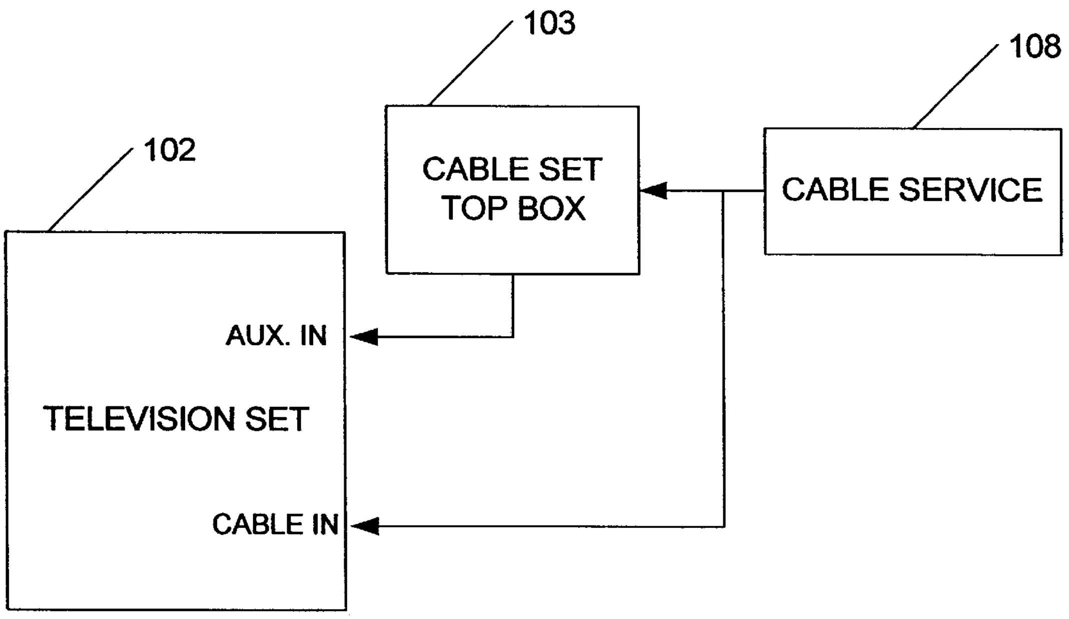
FIG. 3 is an example of a user's TV setup which can be used with the present invention.
FIG. 4 is a table specifying the user's TV setup.

FIG. 3 depicts one of many possible cable television setups that could appear in a user's home, which will be used as an example to explain the present invention. Of course, the invention may be practiced with other setups, including, for example, setups that receive broadcasts from a land based antenna broadcasting VHF signals, a satellite, a Local Area Network, or the Internet. In the depicted configuration, a cable service 108 is hooked up directly to the "cable" input of television 102. The cable service is also routed to a cable set top box 103, which in turn sends a signal to the "aux" input of the television set 102. With this setup, the user is free to select either the cable input (using the tuner in the television) or the aux input (using the tuner in the cable box) for display on the television 102.

Preferably, the handheld remote can control selection of the signal source that is displayed on the television 102. In addition, the handheld remote can control the channel to which the television is set, as well as the channel for any other tuner device (e.g., the cable box 103) in the system. This is preferably accomplished by issuing IR remote commands. In order to control these devices, the handheld remote must be initialized to know which brands of equipment are installed in the user's home, so that it can send out the appropriate IR commands for that equipment. For example, if the television set 102 was made by Sony, the remote must know this in order to issue the appropriate IR commands to control the television 102.

Initialization of the remote is preferably accomplished via IR commands that are transmitted to the remote from the home computer via IR transceivers or via a cable. Alternatively, other means for initializing the remote may be used, including, but not limited to, providing a remote that is pre-initialized at the factory to match a user's video equipment setup, or providing a printed table that lists codes for each manufacturer, with instructions asking the user to enter these codes using the buttons on the handheld remote.

The initialization information that specifies the user's system setup is preferably stored in a file on the home computer in a service and device configuration table 250 (hereinafter the SDC table, shown in FIG. 4). Each row of this table relates to one device that can display information on the user's television. The table includes information specifying an input of the television, the device used to tune to a particular frequency, the manufacturer of that device, the service name, and a service ID. Preferably, this table is stored in the home computer and created using a program that lets the user enter information defining his video equipment setup, or created in the factory from user specified information.

In the illustrated example, the second row of the SDC table 250 indicates that to display a station arriving via the cable box, the television is set to select the aux input, that the cable service providing signals to the cable box is Manhattan Cable, that the service ID for Manhattan Cable is 3888, and that the cable box is made by General Instrument. The third row of the SDC table contains corresponding information for signals arriving directly at the television's cable input, without passing through the cable box. In that case, the station is selected using the built-in tuner on the Sony television. In this example, both rows have the same service ID, because both the cable box and the cable input of the television are fed by the same cable service. When a single user receives service from multiple providers (e.g., cable and satellite), the SDC table would list a different service ID for each provider.

FIG. 5 shows an example of a tuner device current state table 260, which is used by the remote in this embodiment to keep track of the channel to which each tuner device is tuned. Preferably, this table is also stored in RAM in the remote. In the illustrated example, this table stores information indicating that the television tuner is set to channel 5, and that the cable box is set to channel 4. Because the handheld remote is used as a universal remote to control all the television related devices in the user's home, it is simple for the handheld remote to keep track of the particular channel to which each of the tuner devices is tuned. This can be accomplished, for example, by updating an internal register after each channel-changing command is issued to any device.

When a one-way remote control interface from the handheld remote 105 to the currently selected tuner device is used, and a transmission from the handheld remote 105 does not arrive at the tuner (e.g., due to improper aiming of the handheld remote 105, or if an object blocks the IR beam), it is possible that the channel setting in the handheld remote 105 may not match the actual channel setting of the tuner. This situation is referred to herein as a "channel sync error." A bidirectional communication interface (not shown) between the handheld remote 105 and the tuner devices may be implemented to prevent such channel sync errors from occurring. Of course, the tuner device must also be capable of bidirectional communication, but it is envisioned that equipment manufacturers will incorporate such interfaces in their future tuner devices. Details of implementing bidirectional communication interfaces (e.g., a bidirectional IR interface) are well known.

When a bidirectional interface is available, and the handheld remote 105 issues a command to a tuner device, the handheld remote can verify that the tuner device actually received the command by waiting for an acknowledgment from the tuner device. If a suitable acknowledgment does not arrive, the handheld remote can re-issue the command until the acknowledgment is received, thereby correcting the channel sync error.

When a bidirectional interface is not available, it may be possible to reduce the odds of channel sync errors by always using IR commands that access channels directly (e.g., a command that instructs the tuner to go directly to channel 5) as opposed to IR commands that increment or decrement the channel. The appropriate direct channel-access commands are generated even when the user presses a channel-up or channel-down key on the handheld remote 105. While some approaches for dealing with channel sync errors are discussed below, the bulk of the discussion that follows assumes that a channel sync error has not occurred.

FIG. 6 illustrates an event variables table 270. This table includes fields for the date, the time, and the current display device. Keeping track of the date and time may be accomplished by any number of conventional methods including, for example, using a built-in timekeeping feature of the processor in the handheld remote unit, or software that runs on that processor. The table 270 also includes a field, preferably stored in RAM, which tracks the current display device. In the illustrated example, this field would be set to a first value when the television's cable input is selected, and another value when the television's aux input is selected. The handheld remote keeps this field current by updating it after issuing any command which changes the signal source that is being displayed on the television. Preferably, when two or more images are displayed on the television, as with picture-in-picture televisions, the largest display will be tracked.

When the event button on the handheld remote is pressed, information from the tuner device current state table 260 and the event variables table 270 are extracted and stored in a time stamp table 280, shown in FIG. 7. Each time the event button is pressed, an additional entry is added to the time stamp table 280. These entries are referred to herein as "time stamps" or "markers". The example illustrated in FIG. 7 includes four such time stamps. The number of time stamps that can be stored in the time stamp table 280 may be limited at a preset number, or may be determined by the amount of available RAM available in the handheld remote. Preferably, time stamps are erased from the time stamp table when they are transferred to the home computer.

Figure 8:
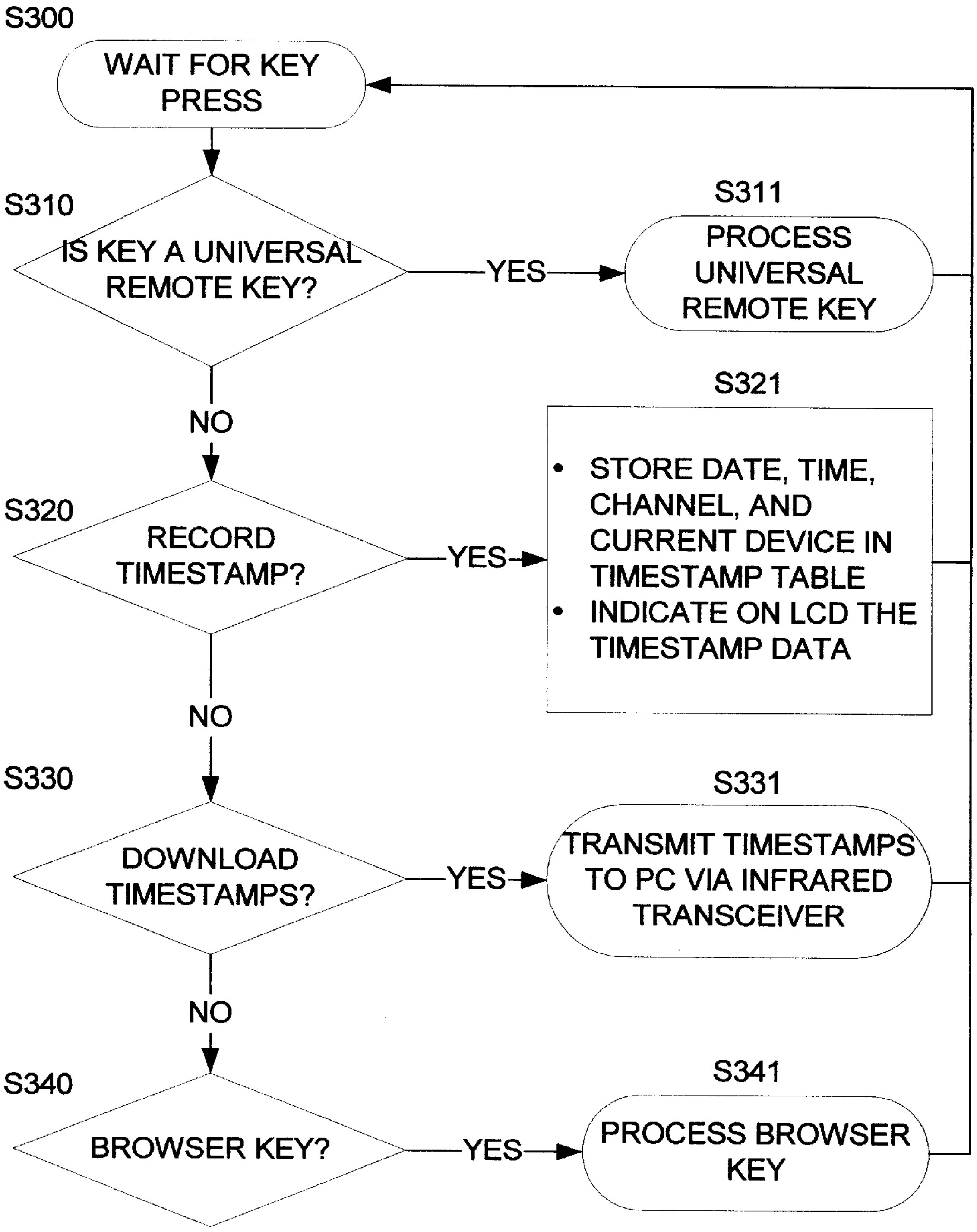
FIG. 8 is a flowchart depicting the operation of the handheld remote of the first preferred embodiment.

FIG. 8 illustrates the functions performed in the handheld remote, which are preferably performed in software running on the processor within the remote. In step S300, the program waits for a key to be pressed. This can be accomplished in any number of ways including, for example, receiving an interrupt from a keyboard interface or by strobing an input port until a key press has been detected. Once a key press has been detected, processing proceeds to step S310.

In step S310, the pressed key is tested to determine whether it is universal remote key, such as a volume control key, or a channel changing key. If the pressed key is a universal remote key, then the key is processed in step S311. If the pressed key is not a universal remote key, then processing continues to step S320, where a test is performed to determine whether the pressed key is the event button (referred to in FIG. 8 as the record time stamp key).

If the pressed key is the event button, it is processed in step S321, where the remote stores the date, time, channel and current device in the time stamp table 280, thereby creating an entry in that table. In the example depicted in FIG. 7, the second entry indicates that the event button was pressed while the user was watching channel 5 from the cable box on Nov. 10, 1998 at 8:26 PM. Alternatively, in embodiments where only one station is supported by the system, the channel and current device information can be omitted from the time stamp table, because those fields would always contain the same information. Returning now to FIG. 8, the time stamp data for the event is displayed on the LCD of the handheld remote.

If, in step S320, the pressed key is not the event button, processing continues to step S330 where a test is performed to determine whether the pressed key is the transfer command (referred to in FIG. 8 as the download time stamps key). If it is a transfer command, the time stamps are transmitted to a computer receiver via the IR transceiver in step S331. If the pressed key is not a transfer command, processing continues in step S340.

Step 340 is implemented only in embodiments that support browsing directly from a handheld remote, which is an optional feature. Dedicated keys may be added to the remote for this purpose. In step S340, the pressed key is tested to determine whether it is a browser key. If it is, processing of the browser key occurs in step S341, which preferably forwards the browser key directly to the computer. When browsing from the remote is not implemented, browsing can be accomplished in any traditional manner, such as using a mouse attached to the home computer.

Finally, after the pressed key is processed, the program returns to step S300 to wait for the next key press.

Figure 9:
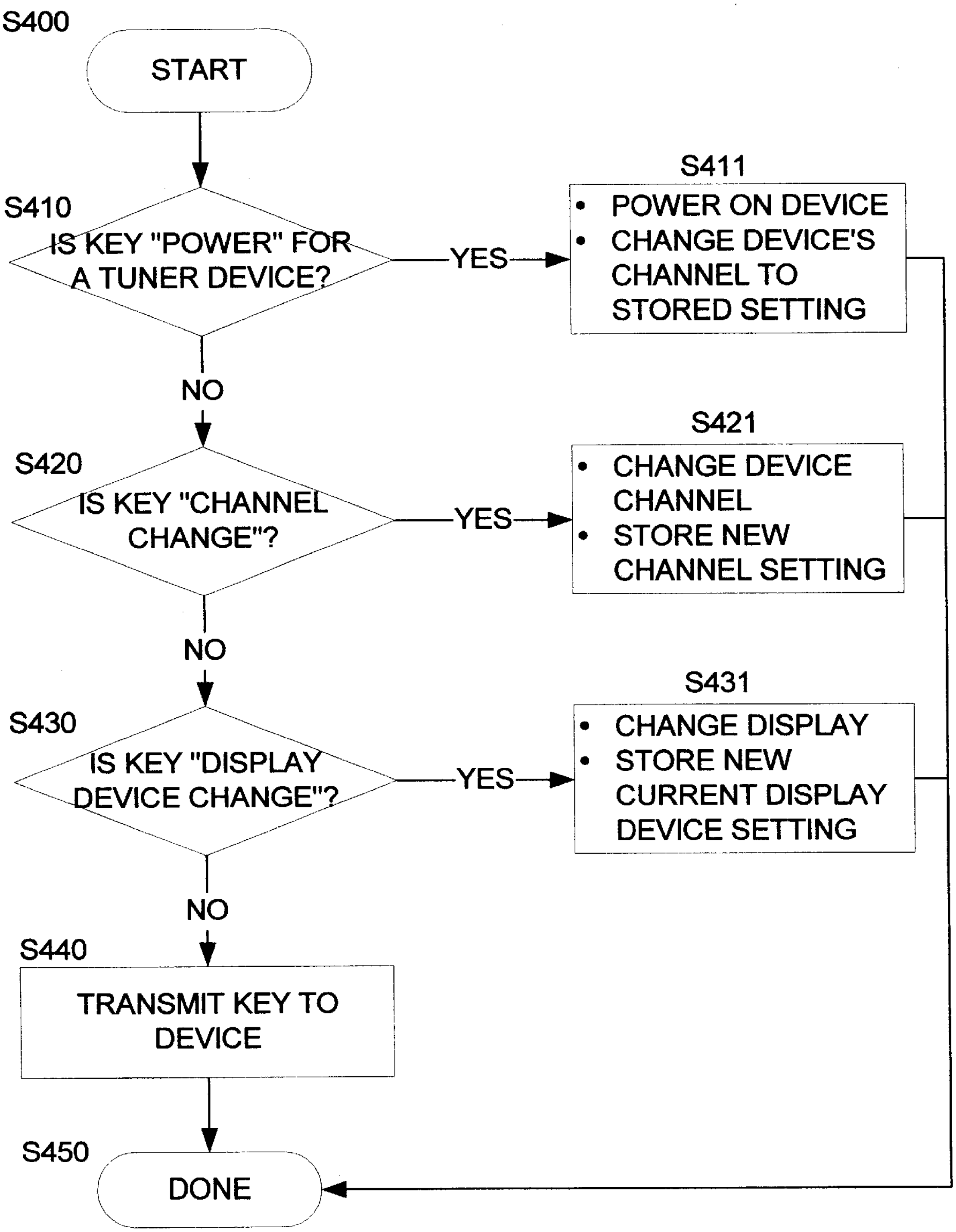
FIG. 9 is a flowchart depicting processing of universal remote keys in the handheld remote of the first preferred embodiment.

FIG. 9 describes the processing of universal remote keys. Processing begins in step S400. In step S410, if the pressed key is a power key for a tuner device (i.e., a key which turns on a tuner), then that key is processed in step S411. In step S411, the remote issues an IR command to turn on the device, followed by an IR control command which changes the device's channel to the channel that is already stored in the handheld remote's internal register. This channel setting is obtained from the tuner device current state table 260 (shown in FIG. 5). This ensures that the variables in the handheld remote match the actual settings of the devices, forcing the devices to a known state.

If the pressed key is not a power key, processing continues in step S420, where a test is performed to determine whether the pressed key is a channel change key. If it is a channel change key, the pressed key is processed in step S421. In step S421, the remote issues an IR command to change the channel on the currently selected device. It also stores the new channel setting in the tuner device current state table 260 (shown in FIG. 5).

If the pressed key is not a channel change key, then processing continues in step S430 where a test is performed to determine whether the pressed key is a display device change key. If the pressed key is a display device change key, it is processed in step S431. In step S431, the handheld remote issues an IR command to change the display device being displayed on the television. The new current display setting is also stored in the event variables table 270 (shown in FIG. 6).

If the pressed key is not a display device change key, then processing continues to step S440 where the handheld remote issues an IR command corresponding to the key pressed. Keys that are processed in this step include all keys that are not power, channel change, or display change command keys (e.g., a volume change command). Finally, this subroutine ends in step 450.

Figure 10:
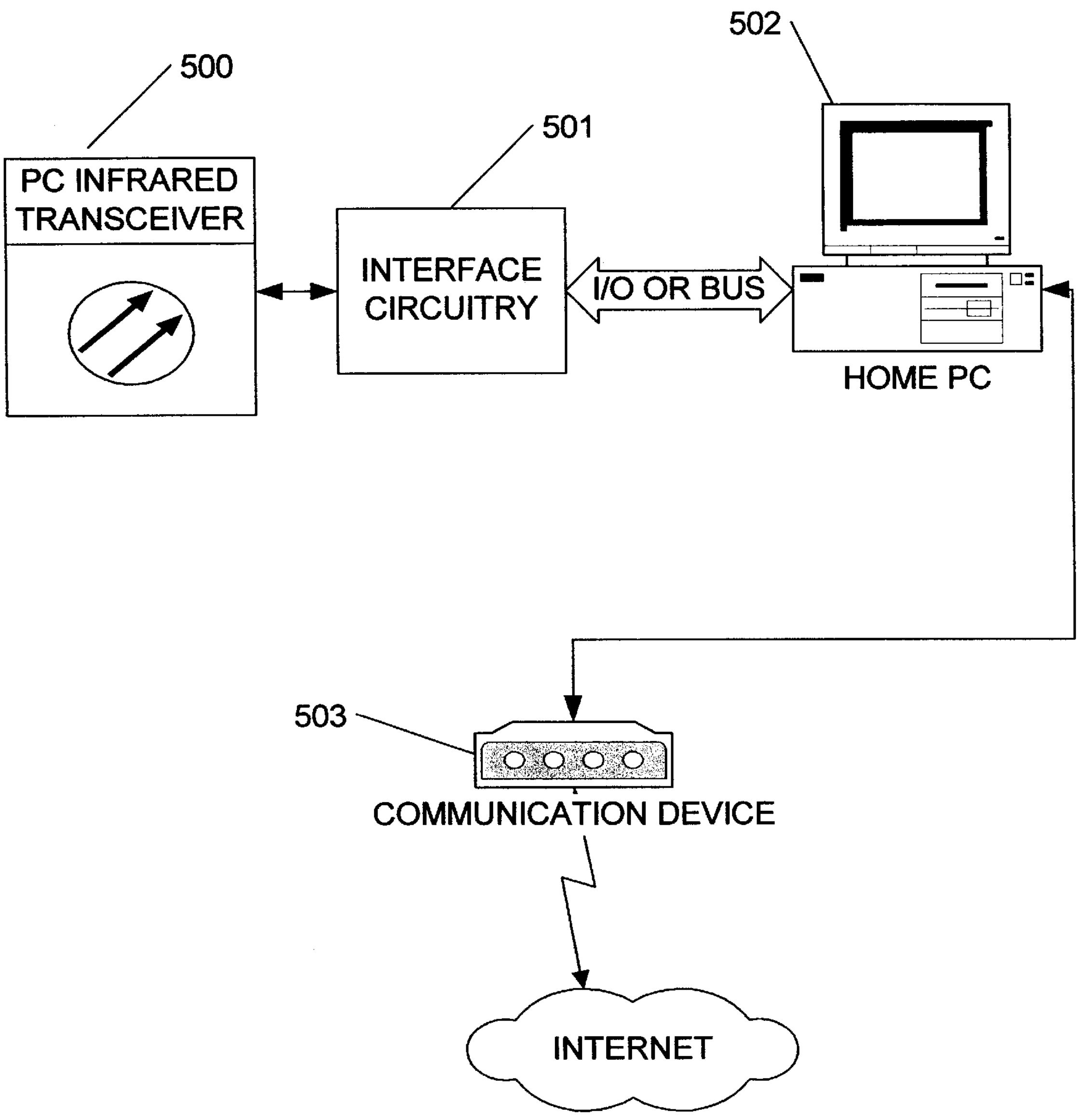
FIG. 10 is a block diagram of a home computer setup used with the first preferred embodiment.

FIG. 10 depicts an example of a home computer setup suitable for use with the present invention. The home computer 502 is connected to appropriate interface circuitry 501, either via an internal bus, or via a connector and a cable. This interface circuitry 501 enables the computer 502 to communicate with the IR transceiver 500. The connections and communication between the computer 502 and the IR transceiver 500 can be implemented in any conventional manner. One example of a suitable device for performing this function is the Actisys IR220L.

To establish communication with the home computer 502, the user points his handheld remote at the IR transceiver 500 connected to the computer 502. The user then presses the transfer button on his handheld remote to transfer the time stamps stored in the remote to the computer. These time stamps are received by the computer 502 via the interface circuitry 501.

Although the transfer of time stamps from the remote to the home computer described above only involves data flowing in one direction (i.e., from the remote to the computer), two-way communication may also be used to implement handshaking or to improve the reliability of the data transmission, in any conventional manner. Two-way communication is also useful to initialize (or re-initialize) the remote as to which brands of equipment are installed in the user's home, as explained above. Optionally, two-way communication may be used to send messages to the user via the LCD display on the remote.

Figure 11:
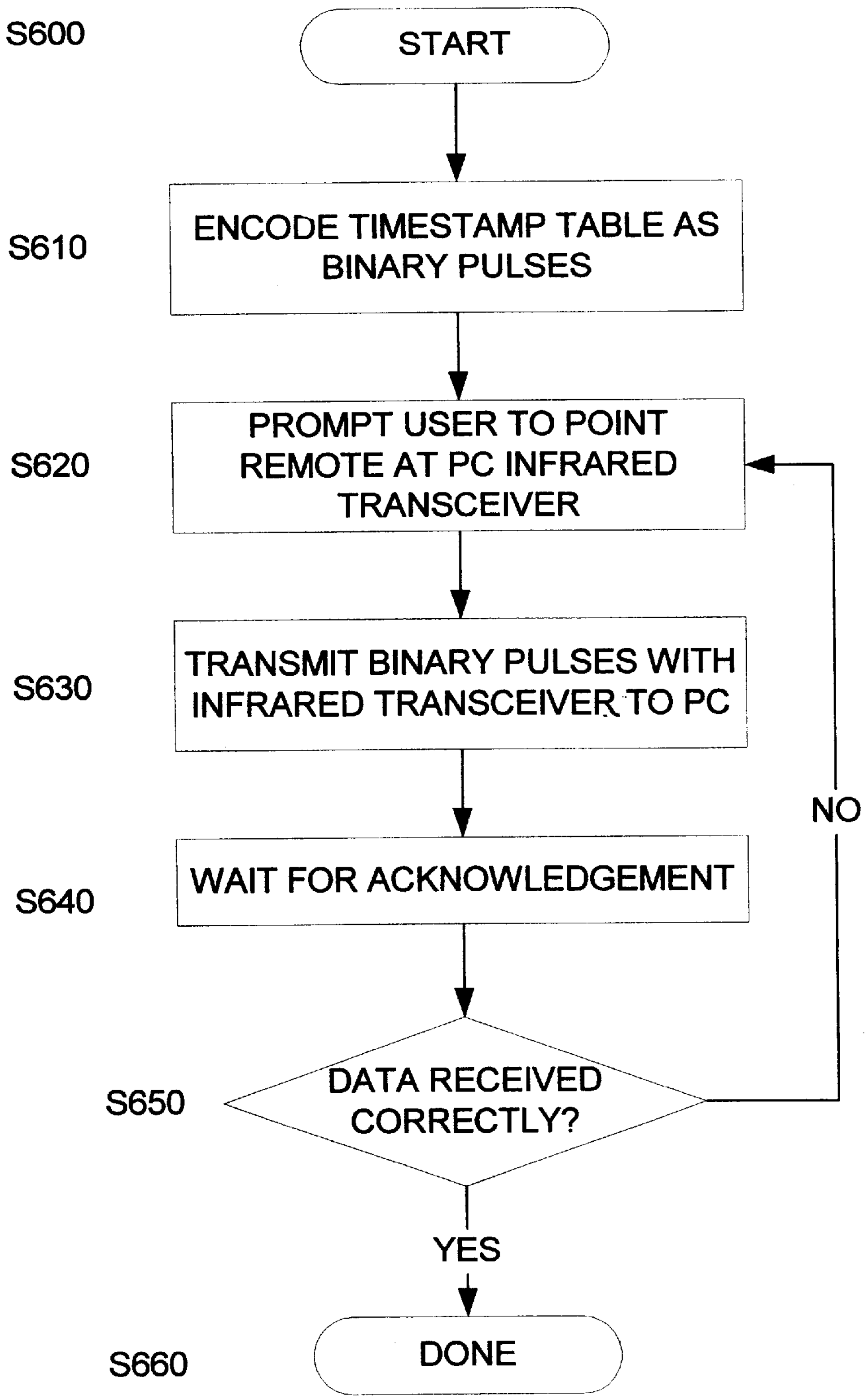
FIG. 11 is a flowchart depicting the transmission of time stamps from the handheld remote in the first preferred embodiment.

FIG. 11 shows the processing that occurs in the remote when data is sent from the remote to the computer using two-way communication. First, in step S610, the time stamps stored in the time stamp table 280 (shown in FIG. 7) are encoded as binary pulses. Then, in step S620, the user is prompted to point the handheld remote at the computer's IR transceiver. This prompt will appear on the LCD display of the handheld remote in embodiments that have such a display. Next, in step S630, the binary pulses are transmitted to the computer via the IR transceiver. In step S640, the remote waits for acknowledgment of the time stamps that were transmitted to the computer. In step S650, a test is performed to determine whether the transmitted data was received correctly by the computer, preferably based on the acknowledgment received in step S640. If the transmitted time stamps were not received correctly by the computer, processing returns to step S620. If the data was received correctly, processing of this subroutine ends.

Figure 12:
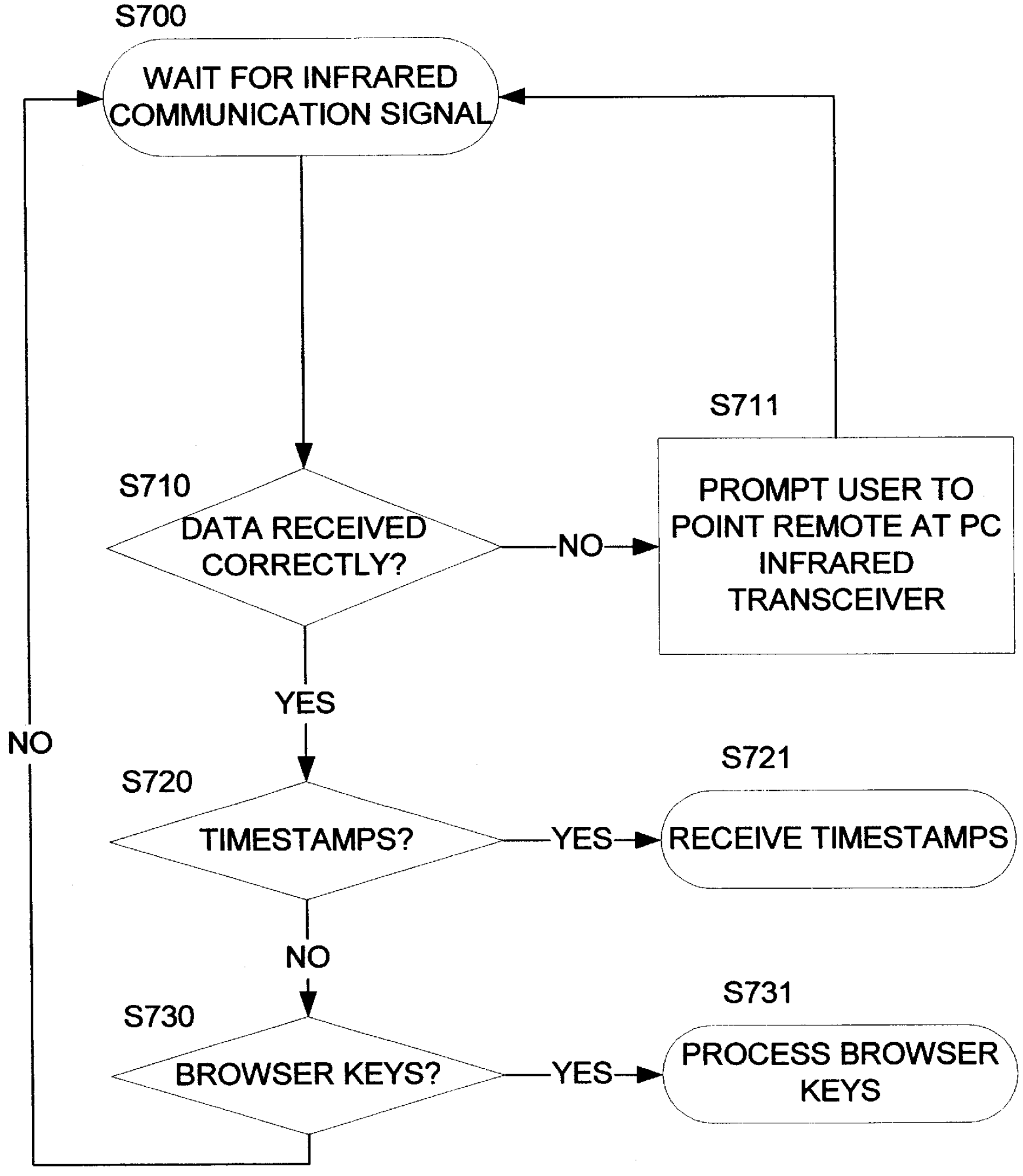
FIG. 12 is a flowchart depicting the reception of time stamps by the home computer in the first preferred embodiment.

FIG. 12 depicts the process that runs in the computer to communicate with the handheld remote. Processing begins in step S700 where the computer waits for an IR communication signal to arrive from the handheld remote. When the communication signal arrives, a test is performed in step S710 to determine whether the data was received correctly. If the data was not received correctly, the computer prompts the user in step S711, using a suitable display or audio message, to point the remote at the computer IR transceiver. If it is determined in step S710 that the data was received correctly, processing continues in step S720 to determine whether the received data represents time stamps. If the received data represents time stamps, the time stamps are processed in step S721.

If the received data is not a time stamp, the received data is tested to determine whether it is a browser key in step S730 (in embodiments that support browsing from the remote). If it is a browser key, it is processed in step S731. This processing would include forwarding the browser key to a web browser running on the home computer, which then communicates with the server via the Internet in a conventional manner.

Figure 13:
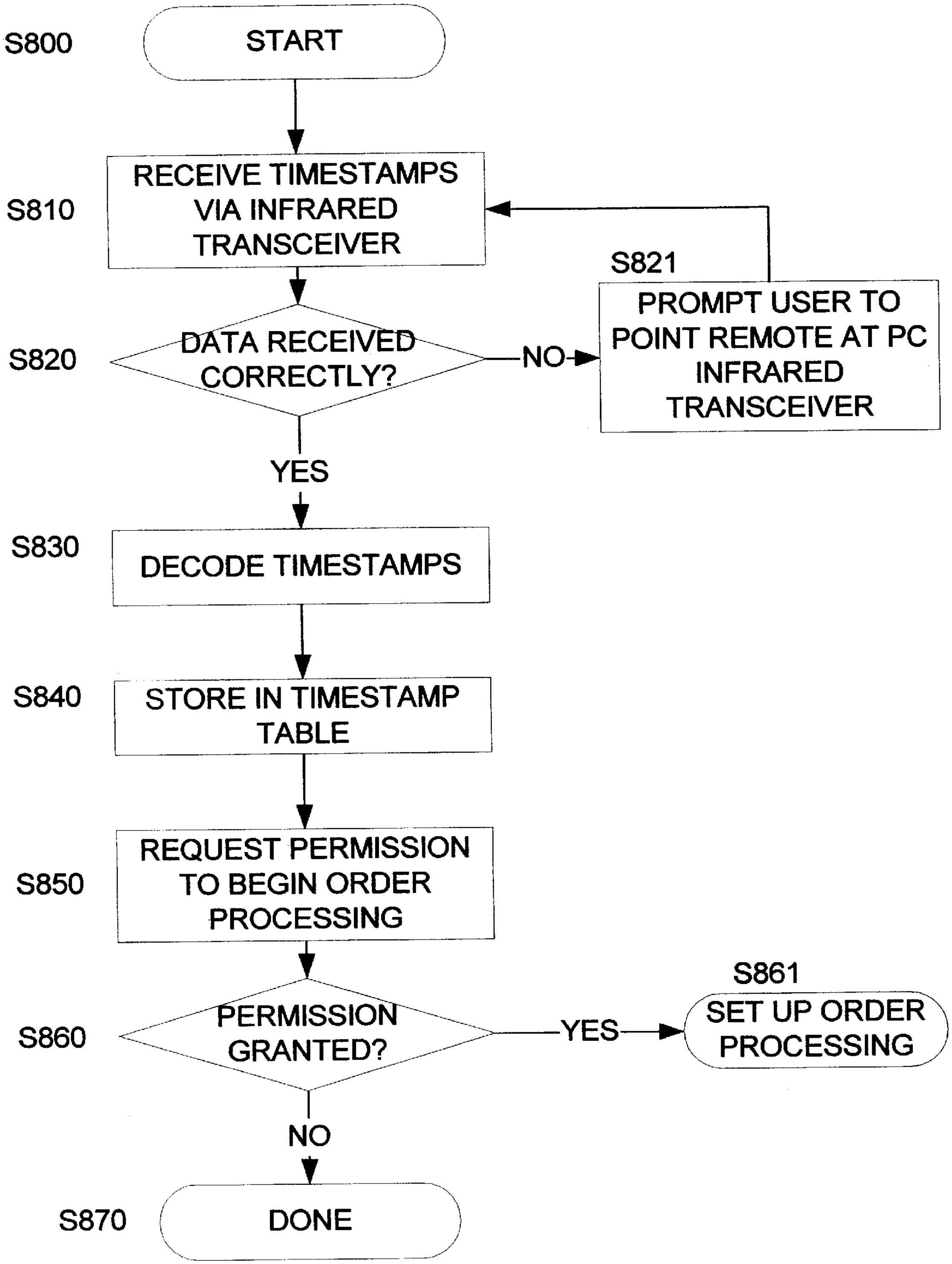
FIG. 13 is a flowchart depicting the processing of time stamps by the home computer in the first preferred embodiment.

FIG. 13 depicts how the time stamps are received and processed by the computer. After the time stamps are received in step S810, the received time stamps are tested in step S820 to determine whether the data was received correctly. If the data was not received correctly, the computer prompts the user, in step S821, to point the handheld remote at the computer IR transceiver. If the data was received correctly, the time stamps that were encoded in the handheld remote are decoded in step S830. Those time stamps are then stored in a time stamp table in the computer in step S840.

Next, in step S850, the computer will request permission from the user to begin processing an order and test for receipt of this permission in step S860. If permission is not granted (which might occur, for example, if the phone line used for Internet access is being used by another person), the subroutine ends in step S870. If permission is granted, order processing is set up in step S861, in which case the computer will establish a connection to the order processing server site via the Internet in any conventional manner, and forward the time stamps and the SDC table information to the server. Preferably, the connection to the server site uses the hypertext transfer protocol (HTTP). Once a connection has been suitably established, the computer encrypts the time stamp information and the SDC table and, optionally, information related to the user (including, e.g., account information). This encrypted information is transmitted to the server via the Internet, also in a conventional manner. Communication with a server then continues as with any other website.

Once the server receives the time stamp, the server must compensate for all time shifts that were introduced when the program was broadcast. This is accomplished by mapping each second of the broadcast, which occurs in real time, into a second of the original uncut program. This process compensates for time shift and skews caused by, for example, delays in starting a program, and commercials that are interspersed with the program.

Figure 14:
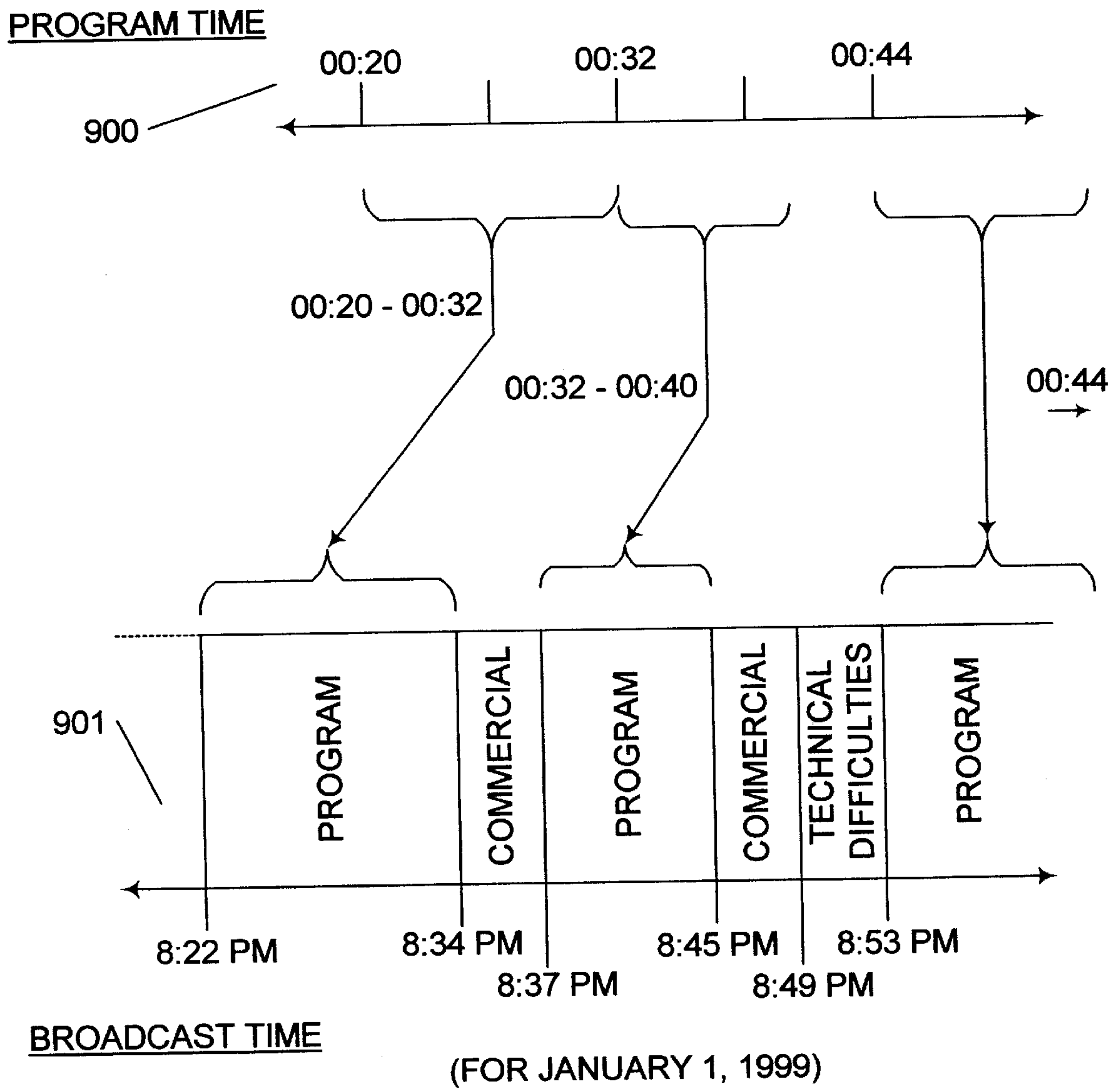
FIG. 14 illustrates mapping broadcast time into program time using time lines.

FIG. 14 shows an example of this mapping. The "program time" time line 900 shows the time with respect to the original program. The "broadcast time" time line 901 shows the actual times that each segment of the program was broadcast. Ordinarily, each moment of program time will map into only one corresponding moment of broadcast time. In the illustrated example, minutes 20 through 32 of the program were broadcasted from 8:22 PM to 8:34 PM on Jan. 1, 1999. After this 12 minute segment, 3 minutes of commercials were broadcasted from 8:34 PM to 8:37 PM. Then, the next 8 minute segment of the program was broadcasted from 8:37 PM to 8:45 PM. Next, a 4 minute commercial was broadcasted from 8:45 PM to 8:49 PM. Minutes 40–44 of the program were never properly broadcast due to technical difficulties, which is indicated in the broadcast time line from 8:49–8:53 PM. The next section of the program (beginning at minute 44), was broadcasted starting at 8:53 PM.

The process of mapping broadcast time to program time is referred to as skew compensation. This skew compensation process can be implemented for programs of any length, including, for example, a half-hour sitcom episode, a two hour movie, (which, when commercials are added, might take 2.5 hours to broadcast), or even a three hour movie, broadcasted in two or more installments on different days. In the latter case, the skew compensation process maps two or more broadcast time lines (one for each day), onto the original three hours of program time. The server uses this map to convert the real time information from each time stamp into a corresponding program time, which is the time in the program that was being broadcast when the event button was pressed. The server can use the determined program time to index into a product database that identifies the products that appear at each time in the program, and thereby determine which products were being displayed at the time the event button was pressed. This process of skew compensation is described in greater detail below.

In addition to obtaining the information contained in the time stamps, the server also must obtain information about the television setup in the user's home. Preferably, this is accomplished by obtaining a copy of the service and device configuration table 250 (shown in FIG. 4, hereinafter "the SDC table"). This is preferably accomplished by transferring a copy of the SDC table from the home computer to the server each time a set of time stamps is transferred from the home computer to the server.

Optionally, customer information for each user may also be stored in the home computer, and transferred to the server together with the time stamps. Alternatively, the customer information could be stored in the server, in which case it would not be transmitted together with the time stamps. The customer information could include a customer code that uniquely identifies each subscriber to the system, and optionally provides additional information about the subscriber. If the SDC table is stored in the server, the customer number could also be used to access the customer's SDC table.

Once the time stamps and SDC table have been received by the server, the time stamps are processed. This processing involves additional information, which is preferably stored in tables on the server, including the media service table 905 (shown in FIG. 15) and the broadcast report table 910 (shown in FIG. 16B).

The media service table 905 indicates which network corresponds to a given channel for a given service. For example, the first row of data in the media service table 905 indicates that channel 20 on service 3888 corresponds to USA networks. The second row indicates that channel 14 on service 3888 corresponds to HB01. The service ID field in this table indicates the service provider (e.g., Manhattan Cable), and corresponds to the service ID field in the SDC table 250 (shown in FIG. 4). Each entry on the media service table also includes a location code which can be used to store information about a time zone.

A program production table 909 (shown in FIG. 16A) holds information that indicates which company produced each program, and a unique content ID that identifies the program. Some programs may be supported by the server one year, but not supported in another year. When only supported programs appear in the table 909, the program production table can be used to indicate which programs are supported by the server. Alternatively, a field can .be added to each entry in the program production table 909 to indicate whether each program is supported.

The fourth entry in the program production table 909 is an example of using the present invention to commercialize products that appear within commercials, and it shows how commercials can be treated like any other program. For example, if the announcer in commercial happens to be wearing a certain hat, and the user presses the event button, this event would be processed just like event button presses that occur during ordinary programs. Instead of identifying a program that corresponds to the time stamp, however, the system would identify the commercial that corresponds to the time stamp.

A broadcast report table 910 (shown in FIG. 16B) is provided to the server for each individual network supported by the server. Alternatively, although not so depicted, a single broadcast report table may be used for all networks, provided that a network identifier entry is added to the table. The broadcast report table 910 is used by the server to determine (1) which program the user was watching when he pressed the event button; and (2) to provide synchronization information which can be used to perform skew compensation.

The first row of data in the illustrated broadcast report table 910 indicates that a segment of a program began broadcasting at 8:22 PM and stopped broadcasting at 8:34 PM, and that the content ID of that program is 2039312. The content ID uniquely identifies a particular program (e.g., episode #12 of Melrose Place, or an edited-for-TV version of The Shawshank Redemption, corresponding to the entry in the program production table 909). The synchronization information in the two right-hand columns of the broadcast report table 910 indicates that at 8:25 PM, the 23 rd minute of that program was broadcast.

The third row of broadcast report table 910 indicates that the same program (i.e., program 2039312) started up again at 8:37 PM and continued until 8:45 PM. The synchronization entries for this row coincides with the start of the segment, since the fade-in time and the broadcast sync time are the same (i.e., 8:37 PM, which corresponds to minute 32 of the program).

Synchronization entries may be performed semi-automatically by, for example, having an operator in the broadcasting studio enter the synchronization data by noting that at 8:25 PM, the 23 rd minute of a particular show (such as episode No. 12 of Melrose Place) was airing. This example is illustrated in the first row of data in the broadcast report table 910. After the data for a given show (or portion thereof) is complete, the broadcast report table entries can be sent to the server, via, for example, a modem connection.

More preferably, the synchronization is performed automatically using a continuous communication link to send each entry from a cooperating broadcaster to the server individually. For example, each entry may be sent at the start of each broadcasted segment. In the example illustrated in the third row of the broadcast table 910, the broadcaster transmits the program synchronization time of 32 minutes at 8:37 PM, which is the time that they fade in the segment that starts at the 32 nd minute of the program. When this arrangement is used, a single entry can be used to represent both the fade in time and the broadcast synchronization time, because they will always be the same.

Optionally, the fade-out time can be eliminated from the broadcast report table 910 by using the fade-in time from the next entry.

Figure 17:
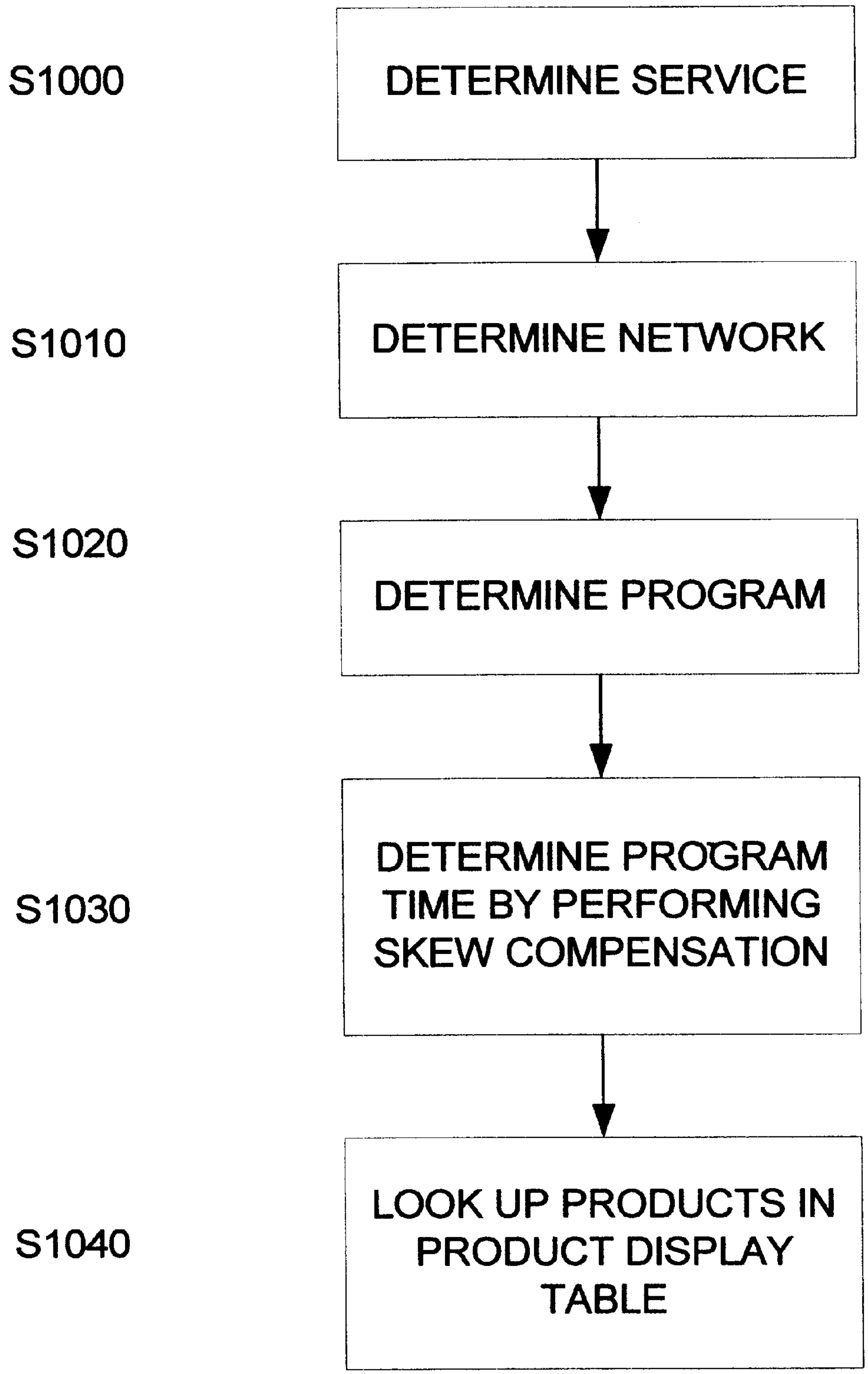
FIG. 17 is a flowchart depicting processing that occurs in the central server.

FIG. 17 is a flow chart that shows how the server processes each time stamp to determine the time within the program when the event button was pressed, based on the time stamp itself, the SDC table, the media service table, and the broadcast report table. This will be explained using the example of the second entry in the time stamp table 280 (shown in FIG. 7). As explained above, copies of this table and the SDC table have been sent to the server.

First, in step S1000, the server determines the particular service that is associated with the time stamp. To accomplish this, the server extracts the tuner device for a given time stamp from the time stamp table 280 (shown in FIG. 7). In the example under consideration, this would be the cable box. Then, the server uses this extracted information as an index into the service and device configuration table 250 (shown in FIG. 4) to determine the service that was providing the signal to the cable box in the user's home. In the example under consideration, this information would be extracted from the first row of the service and device configuration table, which identifies Manhattan Cable, which has an associated service ID code of 3888. In embodiments where only one station is supported by the system, this step can be omitted because the service is always constant.

Next, in step S1010, the server determines the network that was being watched by the user at the time the event button was pressed. This is accomplished by using the service ID determined in step S1000 and the channel extracted from the time stamp as indexes into the media service table 905 (shown in FIG. 15). In the example under consideration, the service ID of 3888 and the channel 5 appear in the third row of the media service table, which indicates that the network is Fox USA. In embodiments where only one station is supported by the system, this step can also be omitted because the network is always constant.

Preferably, the media service table also includes a location code which indicates the location of the user who pressed the event button. This location code is used to compensate for users located in different time zones. Optionally, to handle cases in which two different networks broadcast over the same channel at different times, a time entry (not shown) can also be included in the media service table. If this is done, the time from the time stamp under consideration would also be used as an index into the media service table.

In step S1020, the server determines the particular program that the user was watching when the event button was pressed. This is accomplished by accessing the broadcast report table 910 (shown in FIG. 16B) for the particular network determined in step S1010, and using the time from the time stamp as an index into that broadcast report table 910. Alternatively, in cases where multiple networks are included in a single broadcast report table with an entry to specify the network, both the network determined in step S1010 and the time from the time stamp are used as indexes into the broadcast report table.

In the example under consideration, the broadcast report table 910 is assumed to be the broadcast report table from the Fox USA network, and the time extracted from the time stamp is 8:26. The server uses this extracted time as an index into Fox's broadcast report table 910, and searches for entries that correspond to the extracted time. Preferably, this is accomplishing by checking if the extracted time is later than the fade-in time and earlier than the fade-out time. Here, the extracted time of 8:26 falls between the fade-in time and the fade-out time of the first row of broadcast report table 910. This points to the program with a content ID of 2039312, which uniquely identifies the program that was being watched when the event button was pressed.

In cases when the identified program is not supported by the system, an appropriate message can be returned to the user via the Internet.

Next, in step S1030, the server performs skew compensation to determine the particular time within the program when the event button was pressed. This is accomplished using the synchronization information extracted from the broadcast report table 910. The preferred algorithm for determining the program time (i.e., the time within the program) is implemented using the following equations:

1) $PTS=PST+BTS-BST$

2) $PSB=PST+BTS-BST$

3) $PSE=PST+BTS-BST$ where PST is the program synchronization time, PSB is the program segment begin time, PSE is the program segment end time, PTS is the time stamp time measured in program time, BTS is the time stamp time measured in broadcast time, BST is the broadcast synchronization time, FIT is the fade-in time, and FOT is the fade-out time.

When the broadcast report table 910 is provided automatically at the start of each broadcast segment, as discussed above, the broadcast synchronization time and the fade-in time will be the same, which simplifies equation #2.

Continuing with the example under consideration where the broadcast time stamp is 8:26, and plugging the relevant times into equation 1, the result is:

$$PTS=0{:}23+8{:}26-8{:}25$$

Solving this equation results in a program time of 0:24. This means that when the event button was pressed at 8:26 PM, the 24 th minute of the program was being displayed. It should be noted that while the above example uses one minute increments, using smaller increments (e.g., one second, or 0.1 seconds) is preferable.

After determining the time within the particular program when the event button was pressed, the products that were being displayed at that time can be determined by referencing the product display table 920 (shown in FIG. 19).

Preferably, the product display table is created before broadcasting the program, and inputted into the server. A product display table can be made for any given program by watching the uncut program and waiting to see whether products supported by the system appear. When those products appear, a product description is entered into the product display table, together with an entry for the appear time (i.e. the time that the product appeared), and a disappear time. Of course, alternative data structures may be used, such as using a product code instead of the product name, or using the duration of appearance instead of the disappear time.

Figure 18:
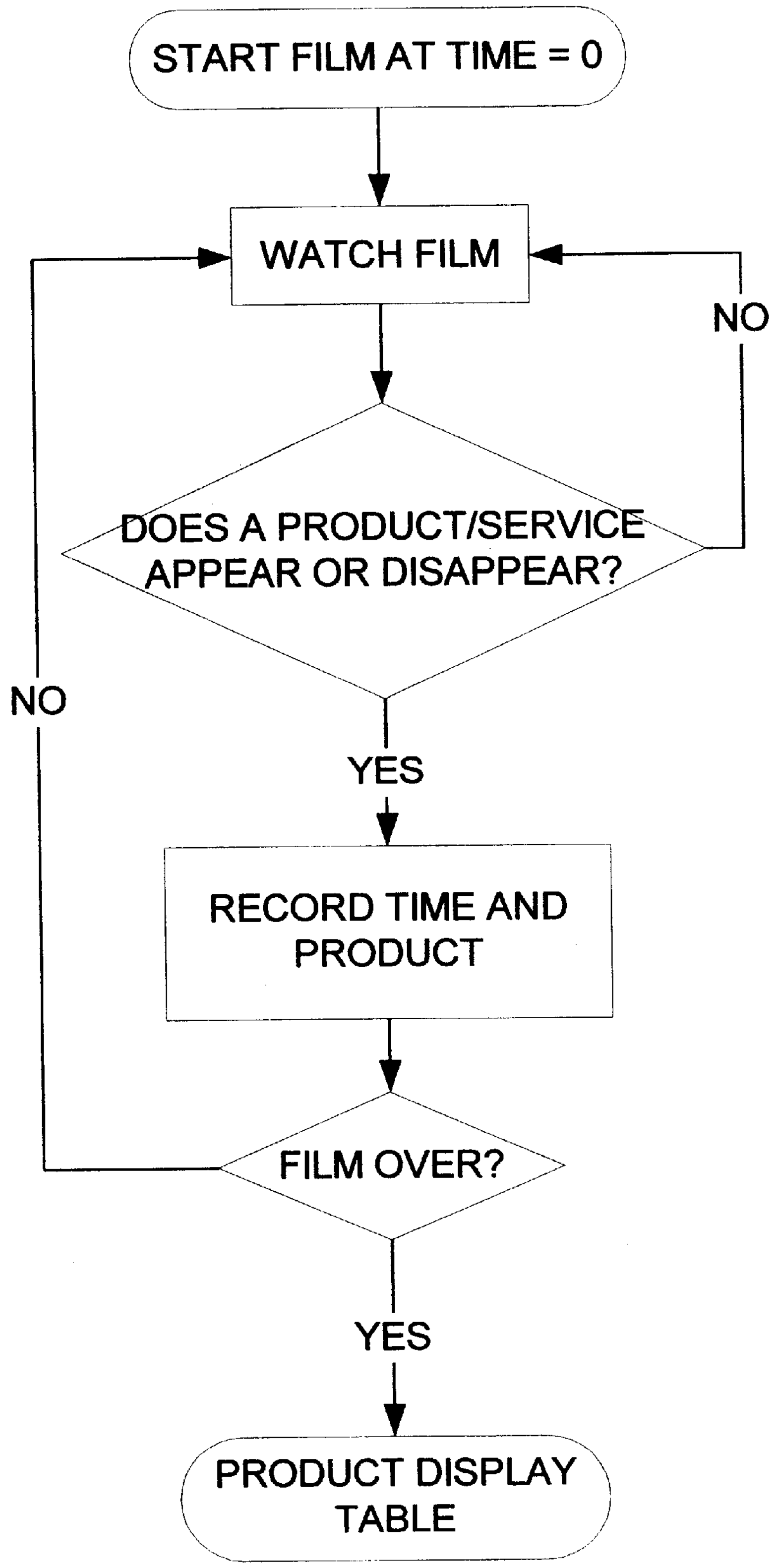
FIG. 18 is a flowchart depicting the creation of the Product Display Table.

An example of this process is illustrated in FIG. 18, which is self-explanatory. An example of the resulting product display table 920 is illustrated in FIG. 19. Each time a product appears, a new entry is generated in the product display table 920. The content ID column of the product display table 920 identifies a particular program (e.g., episode No. 12 of Melrose Place). This process continues until the program is finished. The product display table 920 may be inputted into the server in any conventional manner.

Additional information about the supported products are also inputted by the server in the product table 930 (shown in FIG. 20). The entries in this table are self explanatory. Any suitable alternative or additional information may also be included in the product table 930, including information commonly used in computer-assisted marketing systems.

Figure 21:
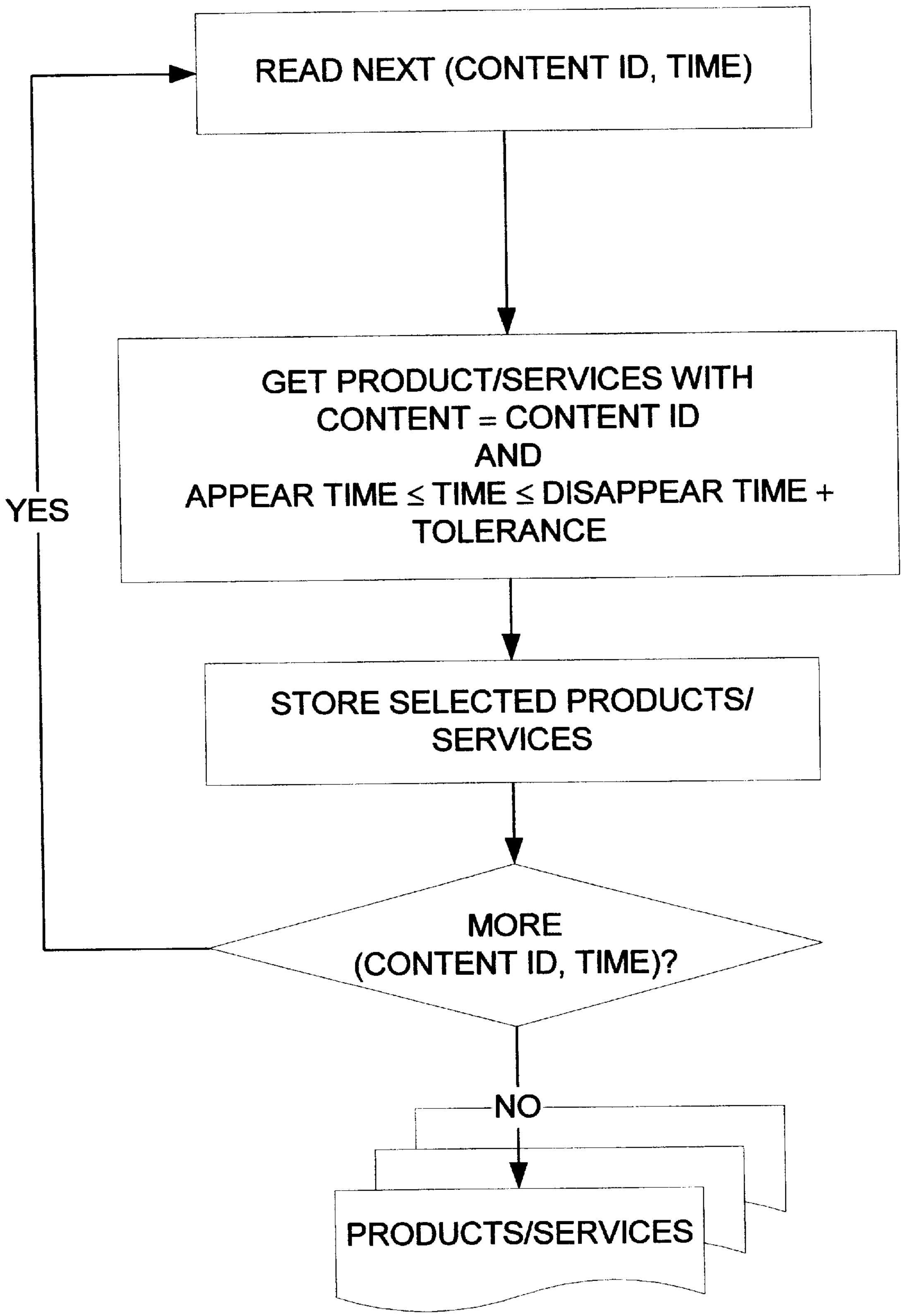
FIG. 21 is a flowchart depicting the conversion of time stamps to products.

Returning now to FIG. 17, once the program time has been determined in step S1030, control passes to step 1040 where the server searches the product display table for entries in which the appear time comes before the time stamp at issue, and the disappear time comes after the time stamp at issue (allowing for a time tolerance). The server selects the products that meet these criteria and presents the resulting assortment of products to the user. An example of this process is illustrated in FIG. 21, which is self-explanatory.

The products can be presented to the user in batches, with each batch corresponding to a particular time stamp. Optionally, the server may retrieve a still-frame image or video clip from the program that recreates the entire image that appeared on the user's television of the time when the event button was pressed. This image can be transferred to user's home computer via the Internet in any conventional manner to enhance the presentation of the assortment of products.

By implementing this option, the system can easily verify that the computed program and time correspond to the program and time that was actually being watched by the user when the event button was pressed. This would be useful, for example, when a channel sync error has occurred, e.g., when a user presses a channel-change button on the remote, but the remote is not aimed at the television. In that case, the channel being tracked in the remote would not match the channel actually being watched. By displaying a still image or video clip from the program, the system can verify the computed program and time by querying the user. If an error is detected, the system can then query the user to determine which program was actually being watched, and then reprocess the time stamp for that program.

Alternatively, each product may be presented to the user individually, in sequence. As yet another alternative, all of the products for all of the time stamps may be presented to the user simultaneously. Numerous other presentation approaches will be apparent to persons skilled in the relevant art.

Finally, the server continues to operate as a conventional web server, using browsing commands from the home computer's web browser (which is operated using either the remote or the computer keyboard, as described above) to provide information and promote the products in the assortment.

In the preferred embodiments described above, each time the event button is pressed, a corresponding time stamp is stored in the handheld remote 105. In these embodiments, the user's home computer 106 may remain off while the user watches television, and only needs to be turned on when the user wishes to transmit the time stamps into the home computer 106 and upload them to the server.

If a home computer 106 is available during the entire TV watching session, an alternative preferred embodiment (hereinafter "the second preferred embodiment") may be implemented. This second preferred embodiment relies on the home computer 106 to keep track of which tuner device and channel is being watched by the user, to keep track of the current time, and to accumulate the time stamps. In this second preferred embodiment, the handheld remote 105 is freed from performing these tasks. To accomplish this, the handheld remote 105 communicates with the home computer 106 each time the event button, a channel-change button, a display device change button, or a power button on the handheld remote 105 is pressed.

The overall system block diagram for this second preferred embodiment is similar to the configuration shown in FIG. 1, except that a bidirectional radio frequency (RF) link is preferably used to communicate between the handheld remote 105 and the home computer 106 instead of the infrared interface (IR I/O) shown in FIG. 1. The RF link may be accomplished using any of a variety of techniques well known to those skilled in the art, including, for example, encoding digital data using frequency shift keying (FSK) or phase shift keying (PSK) before it is transmitted. Examples of suitable RF communication standards include Lucent Technologies' Wavelan wireless network standard and the Bluetooth RF network standard.

Using an RF link enables the handheld remote 105 to communicate with the home computer 106 without requiring an aiming operation (such as pointing the handheld remote 105 at the home computer). Because an RF link is available, initialization of the handheld remote 105 is preferably accomplished via RF commands that are transmitted to the handheld remote 105 from the home computer 106 via the RF transceiver.

Figure 23:
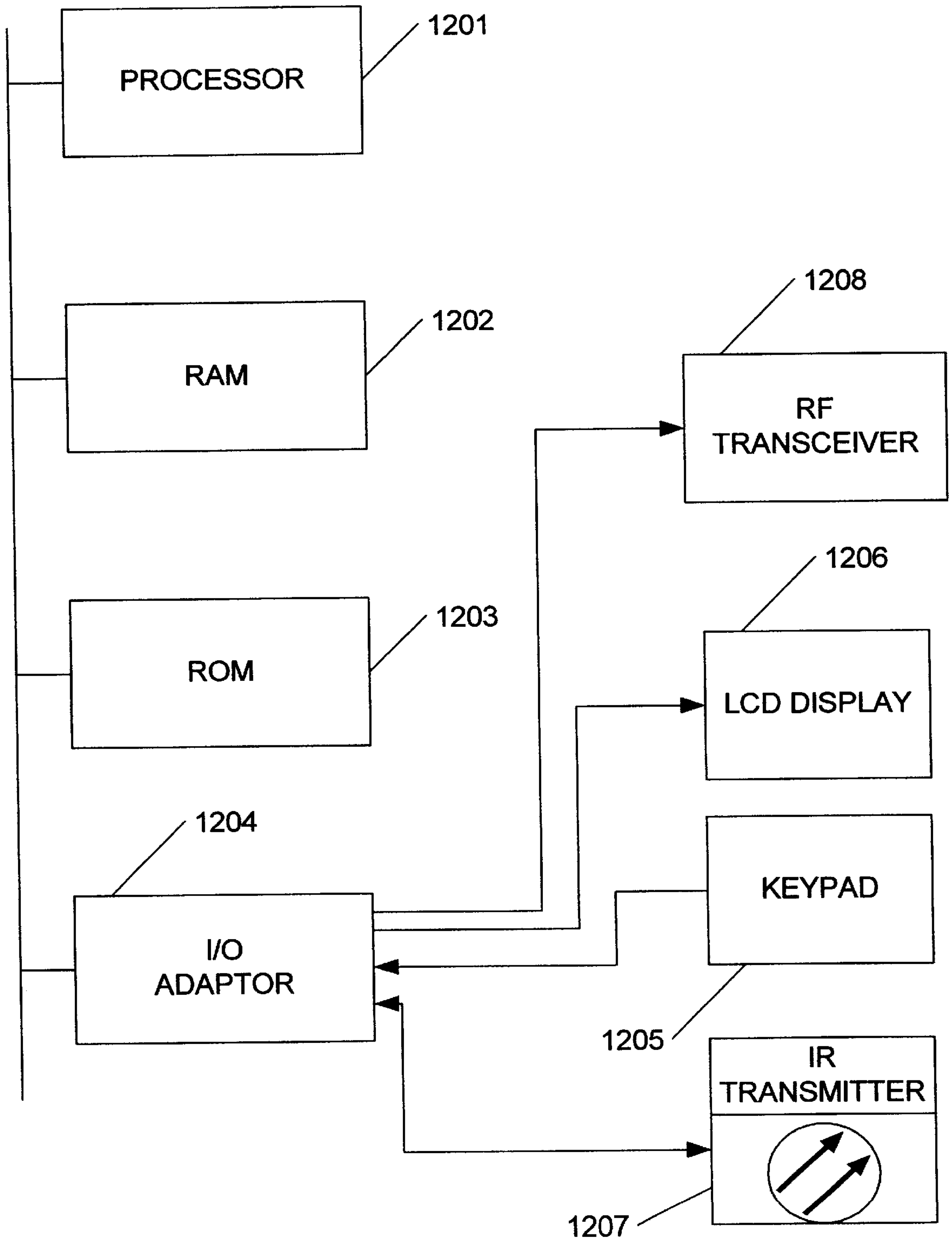
FIG. 23 is a block diagram of a handheld remote used in the second and third preferred embodiments.

FIG. 23 is a block diagram of a handheld remote 105 for use with this second preferred embodiment. The hardware configuration of the handheld remote 105 of this embodiment is similar to the arrangement of the first preferred embodiment shown in FIG. 2, except that an RF transceiver 1208 is added for establishing a communication link with the home computer 106*a*. In addition, a transmit-only IR transmitter 1207 is used in place of the IR transceiver (Ref. No. 207 in FIG. 2), unless a bidirectional communication link is implemented between the handheld remote 105 and the tuner devices (in which case a transceiver would still be required).

The handheld remote 105 of this embodiment includes the conventional buttons found on traditional universal remotes plus one additional "event" button. A "transfer" button is not needed in this embodiment.

Figure 24:
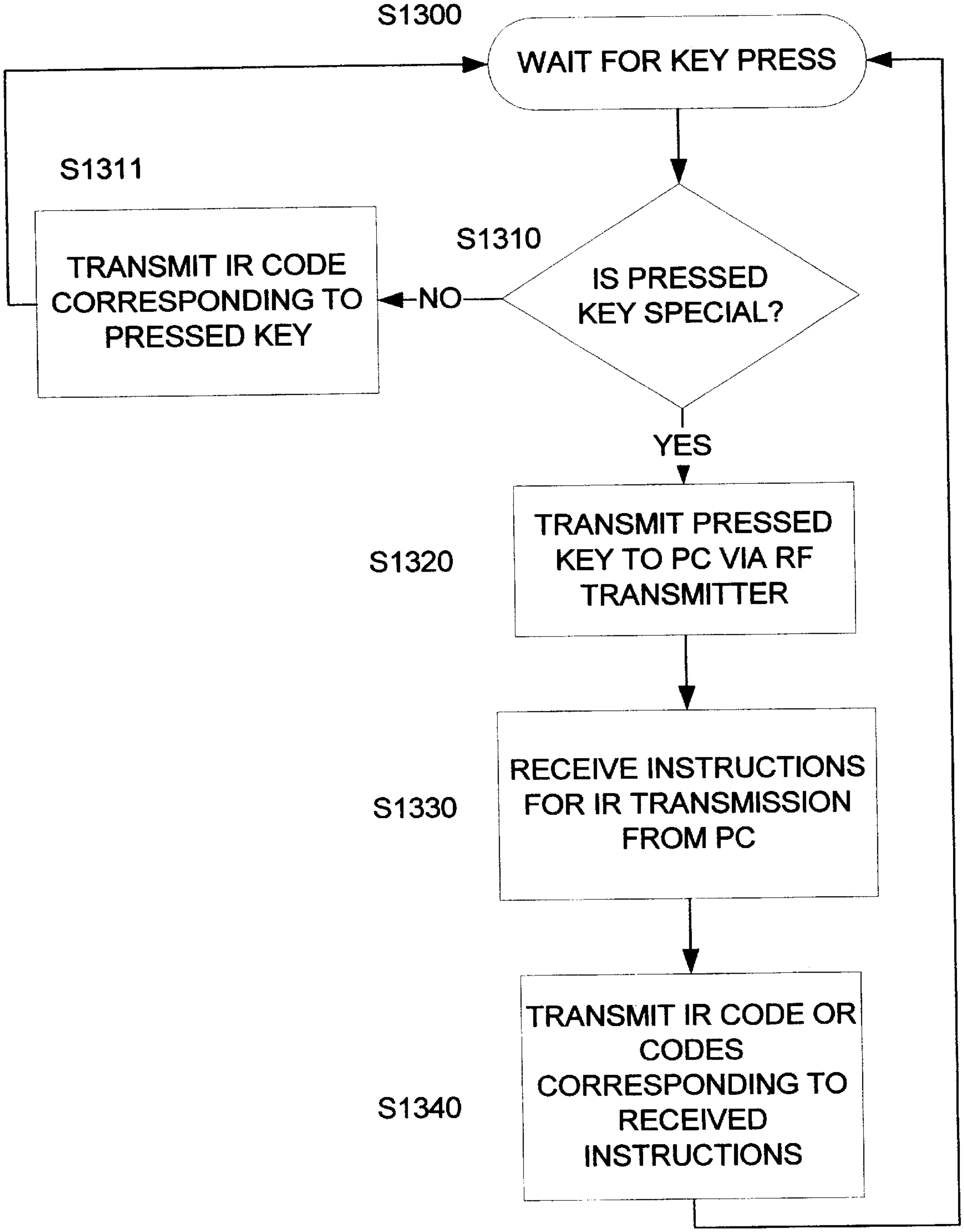
FIG. 24 is a flowchart depicting the operation of the handheld remote of the second and third preferred embodiments.

FIG. 24 is a flowchart depicting the operation of the handheld remote 105 of this second preferred embodiment in the context of user-initiated controls. Preferably, the handheld remote 105 in this embodiment acts as a "dumb" input device for the home computer 106, and as much intelligence as possible is shifted out of the handheld remote 105 and into the home computer 106. In step S1300, the remote remains in a quiescent state until a key on the handheld remote is pressed or until an RF command is received from the home computer 106.

As soon as a key-press is detected, processing proceeds to step S1310, where a test is performed to determine whether the key is a member of the following set of "special" keys: power keys, channel change keys, display device change keys, and the event key. If the pressed key is a member of that set, the key is referred to herein as "special".

If the pressed key is not "special" (e.g., a volume change key), processing proceeds to step S1311, where the infrared code corresponding to the pressed key is transmitted via the IR transmitter 1207.

If the pressed key is "special", processing proceeds to step S1320, where the key-press is reported to the home computer 106 via the RF transceiver 1208 (shown in FIG. 23). Next, the handheld remote 105 waits for instructions from the home computer 106, which are received in step S1330. These instructions inform the remote which, if any, infrared codes should be transmitted via the infrared transmitter 1207. Preferably, these codes will correspond to the keys that were originally pressed on the handheld remote 105. For example, if the user originally pressed the "channel up" key on the handheld remote 105, the instructions received from the home computer 106 will instruct the handheld remote 105 to generate the appropriate infrared codes to change the channel on the currently selected tuner device. The handheld remote 105 will not generate any IR code in response to a null instruction received from the home computer 106. In step S1340, the handheld remote 105 transmits the infrared code or codes corresponding to the instructions received from the home computer 106 via the infrared transmitter 1207. Optionally, a bidirectional interface may be implemented between the handheld remote 105 and the tuner device when IR codes are transmitted, as discussed above in connection with the first embodiment. Control then returns to step S1300, where the handheld remote 105 will remain in a quiescent state until the next key is pressed or until an RF command is received.

In this second preferred embodiment, the home computer 106 tracks the date and time, as well as the tuner device and channel that are being watched (based on channel and tuner change information received from the handheld remote 105). The home computer 106 preferably includes a set of memory locations to store the current state of the user's TV viewing setup in order to perform this tracking. Preferably, each of the service and device configuration 250, the tuner device current state table 260, the event variables table 270, and the time stamp table 280 (shown, respectively, in FIGS. 4–7) are stored in the home computer 106 in this second preferred embodiment. Preferably, the home computer 106 also maintains a buffer for temporarily holding the instructions that are to be sent to the handheld remote 105.

Figure 25:
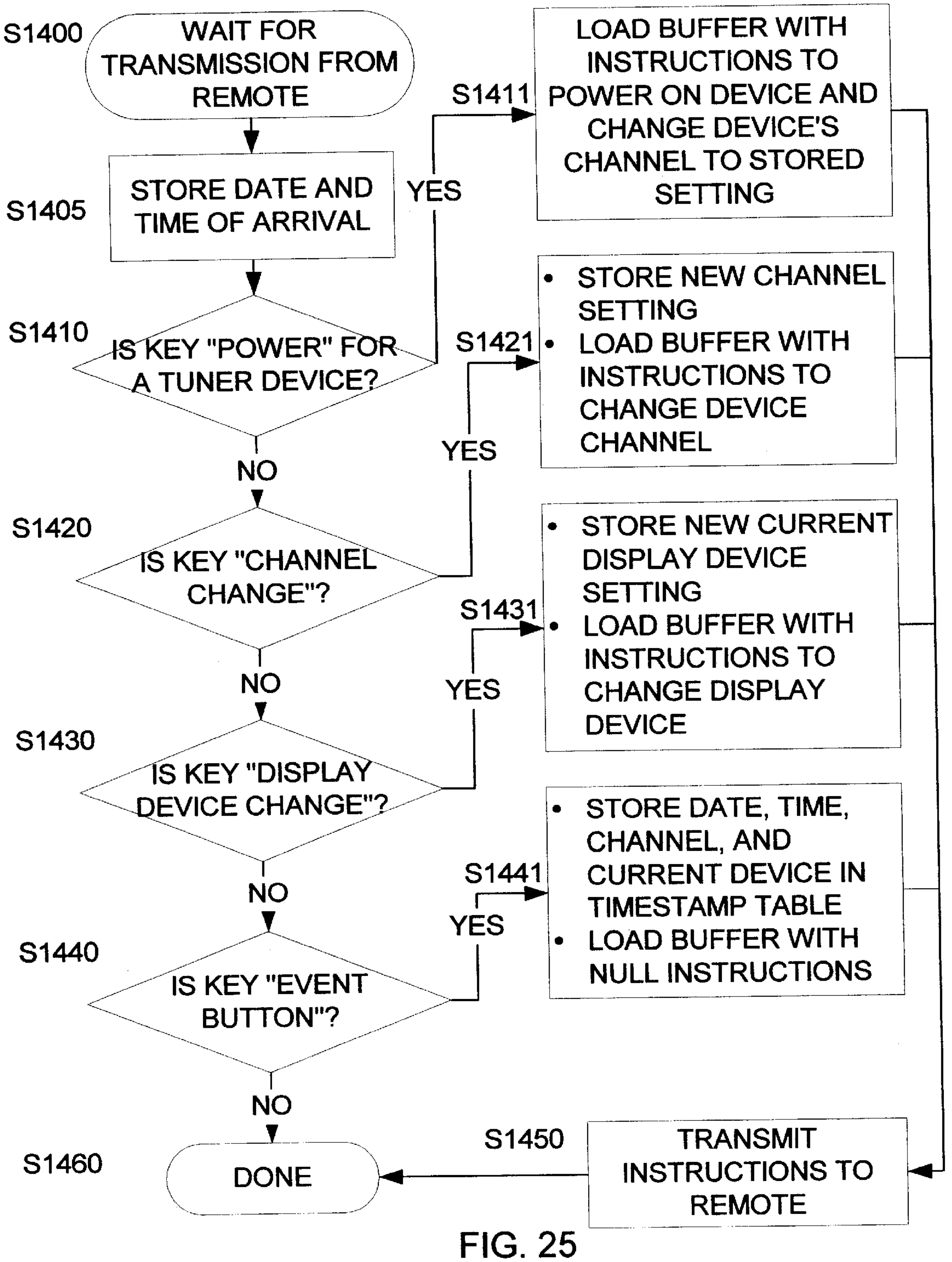
FIG. 25 is a flowchart depicting how received key-presses are processed in the second and third preferred embodiments.

FIG. 25 is a flowchart of a program that runs in the home computer 106 in this second preferred embodiment and responds to button-presses that occur on the handheld remote 105. Processing for this program begins in step S1400, where the home computer 106 waits for a transmission from the handheld remote 105 via an RF transceiver (not shown) connected to the home computer 106. Preferably, each transmission from the handheld remote 105 to the home computer 106 will correspond to a single key-press on the handheld remote 105. When a transmission from the handheld remote 105 is received, the date and time of arrival are extracted from the computer's real time clock in any conventional manner and stored in the event variables table 270 (FIG. 6) in step S1405.

Next, tests are performed to determine what type of key was pressed. First, in step S1410, a test is performed to determine whether the pressed key is a power key for a tuner device. If the pressed key is a power key, processing continues in step S1411, where the home computer 106 loads the buffer with instructions to power on the selected device, and also loads the buffer with instructions to change the channel on that device to a pre-stored setting. This pre-stored setting is preferably retrieved from the device current state table 260 (FIG. 5). When these instructions are received by the handheld remote 105, the handheld remote 105 will generate appropriate IR codes to turn on the selected device and to initialize that device's channel setting to match the pre-stored setting.

If the test in step S1410 indicates that the pressed key is not a power key, processing continues at step S1420, where a test is performed to determine whether the pressed key is a channel change key. If the key is a channel change key, processing continues in step S1421 where the home computer 106 determines the new channel setting and updates the tuner device current state table 260 (FIG. 5). This may be accomplished by either incrementing or decrementing the previous channel setting (preferably retrieved from the tuner device current state table 260) when a channel-up or a channel-down command is received, or by jumping to a new channel when direct entry numeric keys are pressed on the handheld remote 105. In addition, the home computer 106 will load the instruction buffer with instructions to change the device channel on the currently selected tuner device. When these instructions are received by the handheld remote 105, the handheld remote 105 will generate appropriate IR codes to cause the channel to change on the currently selected tuner device.

If the test performed in step S1420 indicates that the pressed key is not a channel change key, processing continues in step S1430, where a test is performed to determine whether the pressed key is a display device change key. If the key is a display device change key, processing continues in step S1431, where the home computer 106 will store the new current display device setting by modifying the contents of the event variables table 270 (FIG. 6). In addition, the home computer 106 will load the instruction buffer with instructions to change the display device. When these instructions are received by the handheld remote 105, the handheld remote 105 will generate appropriate IR codes to select the desired display device.

If the test performed in step S1430 indicates that the pressed key is not a display device change key, processing continues in step S1440, where a test is performed to determine whether the pressed key is the event button. If the pressed key is the event button, processing continues at step S1441, where the home computer 106 adds an entry to the time stamp table 280. Preferably, this is accomplished by extracting the date, time, and current display device from the event variable table 270 and the channel from the tuner device current state table 260 (FIGS. 5 and 6), and storing the extracted information as an entry in the time stamp table 280 (FIG. 7). Each time the event button is pressed, an additional entry is added to the time stamp table 280.

When the event button is pressed, a null instruction is preferably added to the instruction buffer. In response to receipt of this null instruction, the handheld remote 105 will not generate any IR codes. If the test performed in step S1440 indicates that the pressed key is not the event button, the processing routine ends at step S1460 without performing any additional steps.

After the instruction buffer is loaded in any of steps S1411, S1421, S1431, and S1441, processing proceeds at step S1450, where the contents of the instruction buffer are transmitted via the RF transceiver 1208 (shown in FIG. 23) to the handheld remote 105.

Once the user has finished generating new events, the user informs the home computer 106 that he has completed entering events in any conventional manner (e.g., by pressing a function key on the computer's keyboard, or by clicking a mouse on an appropriate icon or button). At this point, the home computer 106 will attempt to establish a connection to the order processing server site 107 via the Internet, and forward the collected time stamps and the SDC table 250 (FIG. 4) to the server 107 (as in the first embodiment).

Once the time stamps have been forwarded to the server 107 in this second preferred embodiment, processing in the home computer 106 then continues in the same manner as it did in the first embodiment. The processing that occurs in the server 107 in this embodiment would then be identical to the processing in the first embodiment described above, because the server receives the time stamps from the home computer 106 in a batch (and the manner in which those time stamps were initially collected does not impact the processing performed in the server).

In a first variation of this second preferred embodiment, instead of waiting for a response from the home computer 106 before issuing the IR command, the handheld remote 105 may determine the appropriate infrared codes by itself based on the key that was pressed, and immediately transmit the corresponding IR codes via the infrared transmitter 1207. The communication with the PC (e.g., via RF) may then be performed after the IR codes have been transmitted, or simultaneously therewith. This variation may be implemented when either a bidirectional interface or a unidirectional interface is used to communicate between the handheld remote 105 and the tuner devices.

In a second variation of this second preferred embodiment, when a real time connection with the Internet is available, the time stamps may be sent to the server 107 one at a time, as soon as each one is created in the home computer 106. The server could then return information to the user while the user is still watching television, if the user so desires.

If a real-time connection with the Internet is always available, yet another preferred embodiment (hereinafter "the third preferred embodiment") may be implemented. In this embodiment, the home computer 106 acts as a simple conduit that forwards information from the handheld remote 105 to the server 107 and from the server 107 to the handheld remote 105. All the processing implemented in the home computer 106 in the second preferred embodiment is shifted to the server 107, so that the server keeps track of the date and time, as well as the tuner device and channel that are being watched. Preferably, this is accomplished by storing the service and device configuration table 250, the tuner device current state table 260, the event variables table 270, and the time stamp table 280 (shown in FIGS. 4–7) at the server 107.

In this third preferred embodiment, each time any of the "special" keys on the handheld remote 105 is pressed, the handheld remote 105 immediately transmits information to the home computer 106 indicating which key was pressed. The home computer 106 then immediately forwards this information to the server 107, preferably via the Internet. The server 107 then implements the same process that was implemented by the home computer 106 in the second preferred embodiment (steps S1400–S1460, described above in connection with FIG. 25). The only change to that process is that in step S1450, instead of transmitting the instructions directly to the handheld remote 105 (as in the second preferred embodiment), the transmission to the handheld remote 105 in the third preferred embodiment is accomplished by transmitting the instructions to the home computer 106, and having the home computer 106 forward the instructions to the handheld remote 105.

Once the instructions are received by the handheld remote 105, the handheld remote 105 will transmit the IR codes that correspond to the received instructions. It is noteworthy that the hardware and software in the handheld remote 105 of this third preferred embodiment are preferably identical to the hardware and software in the handheld remote 105 of the second preferred embodiment (as described in connection with FIGS. 23 and 24).

The major difference between the second and third preferred embodiments is that the processing performed in the home computer 106 in the second preferred embodiment is shifted to the server 107 in the third preferred embodiment. Because of this shift, the server 107 in this third preferred embodiment does not actually receive completed time stamps from the home computer 106. Instead, the time information for each time stamp is determined by the server 107 based on a time code provided by the data transmission protocol. For example, when the http protocol is used, the time that each data packet was sent out onto the Internet can be determined by examining the data packet, and does not depend on when that data packet actually reaches its destination. Because the server 107 keeps track of the time in this third preferred embodiment based on the transmission protocol, the home computer 106 and the handheld remote 105 do not have to keep track of the time.

For example, if a user presses the event button on Feb. 1, 1999 at 9:03:05 PM, the key-press would be immediately transmitted from the handheld remote 105 to the home computer 106 via RF, and one or more packets of corresponding data would be immediately transmitted from the home computer 106 to the server 107 via the Internet. No time data is explicitly included in the transmitted data itself. The packets of data will usually arrive at the server within a few seconds of 9:03:05 PM. The server 107 then extracts the time and date from the http protocol information associated with the received packet, reads the current display device from the event variables table 270, and reads the current channel for that display device from the tuner device current state table 260. The server 107 then generates a time stamp using this time, date, device, and channel information, and stores the time stamp in the time stamp table 280.

In contrast to the previously-described embodiments in which the time stamps are assembled in the home computer 106, the time stamps in this third preferred embodiment are generated inside the server 107 individually, each in response to a single press of the event button. When the timestamps are generated in the server one at time in this manner (or when they arrive one at a time in the second variation of the second embodiment), the server 107 may optionally send information back to the user via the Internet while the user is still watching TV. The viewer would then be free to direct his attention to this information, if he so chooses. Alternatively, the server 107 in this third embodiment may accumulate the generated time stamps, and wait for the user to initiate an inquiry. Upon receipt of this inquiry, processing of the time stamps may proceed in the same manner described above in connection with the first and second preferred embodiments.

While the first, second, and third preferred embodiments described above each disclose a specific allocation of data storage and processing tasks among the handheld remote 105, the home computer 106, and the server 107, various alternative allocations can also be implemented. For example, a hybrid of the first and second embodiments may be implemented by linking the handheld remote 105 to the home computer 106 using RF communications that are activated each time a "special" key is pressed, tracking the channel in the handheld remote 105, and determining the time and date in the home computer 106 by noting the time that each communication is received from the handheld remote 105. Numerous alternative allocations can be readily envisioned.

Figure 22:
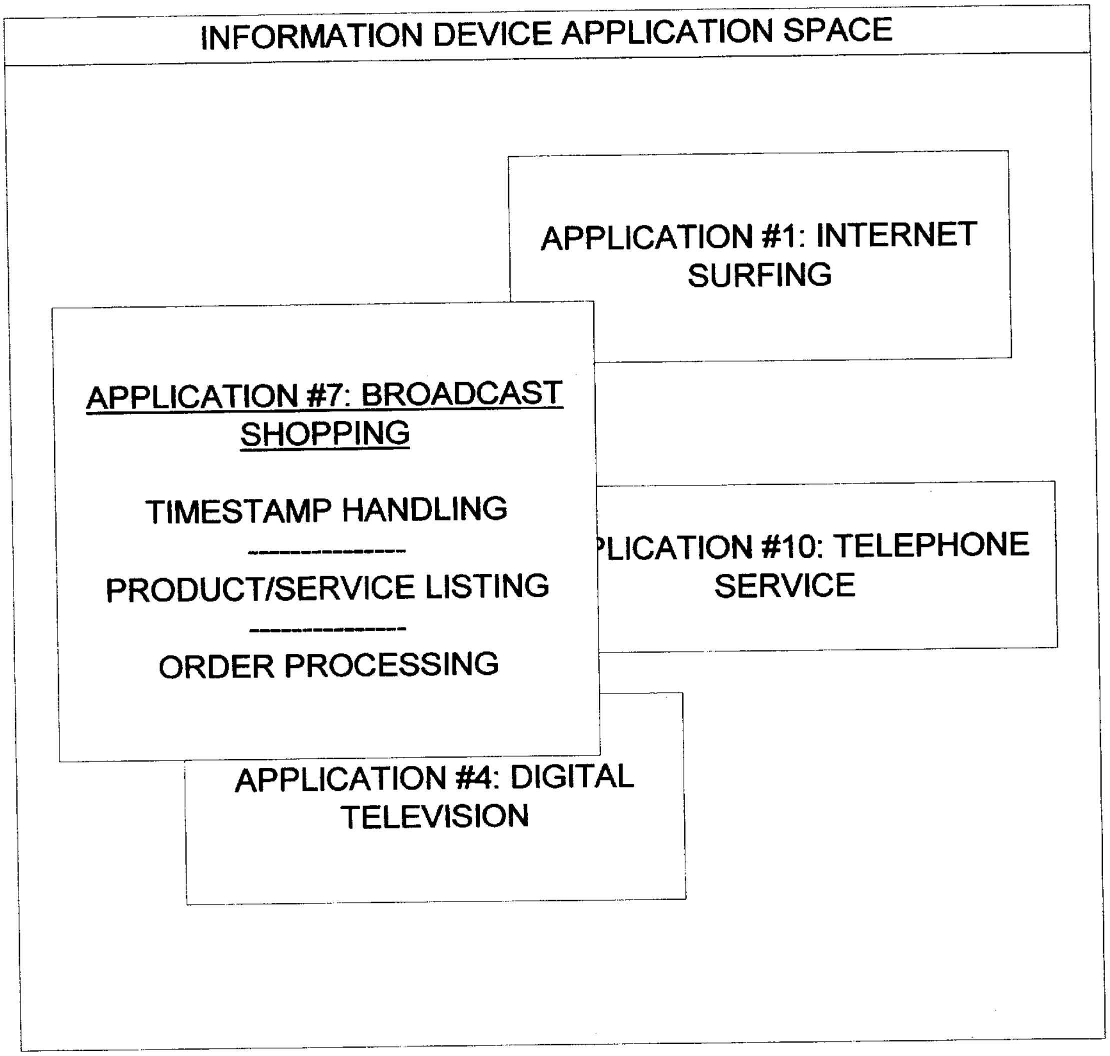
FIG. 22 depicts an alternative embodiment that is implemented in an application space on a computer.

It is to be understood that the present invention is not limited to the specific embodiments described above, and that various changes and modifications can be effected without departing from the scope or spirit of the present invention. One such modification is depicted in FIG. 22 which shows implementing the present invention in an operating system application space on a computer, a TV set-top box, or a digital TV. In this configuration, the functions of the television, the handheld remote, and the Home Computer are all combined into a single device. Similarly, the present invention can also be implemented in another devices that supports Internet communications. Another possible modification would be to implement the system to support only one broadcaster, and simplifying the processing performed in the server accordingly.

Another modification would be to apply the present invention to other types of broadcasted video information, (including, for example, Internet broadcasts), or even to audio broadcasts (including, for example, FM radio). Yet another modification would be to send customer specified information from the computer to the remote during data transfer sessions. This information could include, for example, birthday and anniversary reminders that are initially entered at the home computer. At the appropriate time (e.g., five days before the birthday), the remote can be programmed to display an appropriate message on the LCD display. Still another modification would be to distribute the various functions among different locations, by, for example, having the broadcaster perform some of the server processes described above. Numerous other alternative embodiments can be readily envisioned.

We claim:

1. A method of commercializing products that are present in a television broadcast of a program, the method comprising the steps of:

inputting product information that identifies a plurality of products which are present in the program and a time of presence within the program for each of the products;

inputting skew information that identifies a correspondence between an actual time of broadcast and a relative time within the program for at least one segment of the program;

inputting a signal that was generated in response to an indication of interest made by a user while watching the television broadcast;

determining a time-of-interest corresponding to the indication of interest made by the user based on a time of arrival of the signal inputted in said signal inputting step;

identifying a specific portion of the program that was being broadcast at the time-of-interest based on the time-of-interest and the inputted skew information;

determining an assortment of products that were present in the television broadcast at the time-of-interest based on the specific portion identified in said identifying step and the inputted product information; and presenting the determined assortment of products to the user.

2. The method of claim 1, wherein the television broadcast includes a plurality of programs that are broadcasted in turn, and the step of identifying a specific portion of the program comprises the steps of:

identifying one program selected from the plurality of programs based on the time-of-interest and inputted broadcast information that identifies when the one program was broadcasted; and identifying a specific portion of the one program that was being broadcast at the time-of-interest based on the time-of-interest and the inputted skew information.

3. The method of claim 1, further comprising the steps of:

receiving an indication from the user selecting a product from the presented assortment; and providing, to the user, information relating to the selected product.

4. The method of claim 3, wherein said step of providing information to the user comprises at least one of: offering the selected product for sale, providing information about the selected product, providing a referral to a seller of the selected product, and providing a link to a seller of the selected product.

5. The method of claim 1, wherein the product information includes, for each of the products, an appear time and a disappear time within the program.

6. The method of claim 1, wherein the skew information is inputted from a television station during the television broadcast of the program.

7. The method of claim 1, wherein the product information is inputted from a database prior to the television broadcast of the program.

8. The method of claim 1, wherein, in said signal inputting step, the signal is inputted via the Internet, and wherein, in said presenting step, the determined assortment of products are presented to the user via the Internet.

9. The method of claim 1, wherein said step of presenting the determined assortment of products to the user comprises transmitting to the user, via the Internet, an image of a scene that was being broadcast at the time selected by the user.

10. A method of commercializing products that are present in a plurality of simultaneous television broadcasts of a plurality of programs over a plurality of channels, the method comprising the steps of:

inputting, for each of the programs respectively, product information that identifies a plurality of products which are present in the respective program and a time of presence within the respective program for each of the products;

inputting, for each of the programs respectively, skew information that identifies a correspondence between an actual time of broadcast and a relative time within the respective program for at least one segment of the respective program;

inputting an event signal that was generated in response to an indication of interest made by a user while watching the television broadcast;

determining a time-of-interest corresponding to the indication of interest made by the user based on a time of arrival of the event signal inputted in said event signal inputting step;

inputting a channel-change signal that was generated in response to a channel change command made by the user;

determining a channel based on the channel change signal inputted in said channel-change signal inputting step;

identifying a specific portion of a specific program that was being watched by the user at the time-of interest based on the time of interest, the channel determined in said channel determining step, and the inputted skew information;

determining an assortment of products that were present in the specific program at the time-of-interest based on the specific portion identified in the identifying step and the inputted product information; and presenting the determined assortment of products to the user.

11. The method of claim 10, wherein each of the television broadcasts includes a plurality of programs that are broadcasted in turn, and the step of identifying a specific portion of the program comprises the steps of:

identifying a broadcaster based on the channel determined in said channel-determining step;

identifying one program selected from the plurality of programs for the identified broadcaster, based on the time-of-interest and inputted broadcast information, wherein the inputted broadcast information identifies when the one program was broadcasted by the identified broadcaster; and identifying a specific portion of the one program that was being broadcast at the time-of-interest based on the time-of-interest and the inputted skew information.

12. The method of claim 10, further comprising the steps of:

receiving an indication from the user selecting a product from the presented assortment; and providing, to the user, information relating to the selected product.

13. The method of claim 12, wherein said step of providing information to the user comprises at least one of: offering the selected product for sale, providing information about the selected product, providing a referral to a seller of the selected product, and providing a link to a seller of the selected product.

14. The method of claim 10, wherein the product information includes, for each of the products, an appear time and a disappear time within the program.

15. The method of claim 10, wherein the skew information is inputted from respective television stations during respective television broadcasts of respective programs.

16. The method of claim 10, wherein the product information is inputted from a database prior to the television broadcast of each program.

17. The method of claim 10, wherein the event signal is inputted via the Internet in said event signal inputting step, the channel change signal is inputted via the Internet in said channel-change signal inputting step, and the determined assortment of products are presented to the user via the Internet in said presenting step.

18. The method of claim 10, wherein said step of presenting the determined assortment of products to the user comprises transmitting to the user, via the Internet, an image of a scene that was being watched by the user at the time selected by the user.

19. A method of commercializing products that are present in a plurality of simultaneous television broadcasts of a plurality of programs over a plurality of channels, the method comprising the steps of:

inputting, for each of the programs respectively, broadcast and product information that identifies a plurality of products which are present in the respective broadcast and a time of presence within the respective broadcast for each of the products;

inputting an event signal that was generated in response to an indication of interest made by a user while watching any of the television broadcasts;

inputting a channel-change signal that was generated in response to a channel-change command made by the user;

determining an assortment of products that were present in a specific program that was being watched by the user at the time the user made the indication of interest based on the event signal, the channel-change signal, and the inputted broadcast and product information; and presenting the determined assortment of products to the user.

* * * * *